US009176870B2

(12) United States Patent
Harris et al.

(10) Patent No.: US 9,176,870 B2
(45) Date of Patent: *Nov. 3, 2015

(54) OFF-HEAP DIRECT-MEMORY DATA STORES, METHODS OF CREATING AND/OR MANAGING OFF-HEAP DIRECT-MEMORY DATA STORES, AND/OR SYSTEMS INCLUDING OFF-HEAP DIRECT MEMORY DATA STORE

(71) Applicant: Software AG USA, Inc., Reston, VA (US)

(72) Inventors: Steven T. Harris, San Francisco, CA (US); Christopher Dennis, Martinsburg, WV (US); Saravanan Subbiah, San Mateo, CA (US)

(73) Assignee: Software AG USA, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,017

(22) Filed: Aug. 7, 2014

(65) Prior Publication Data

US 2014/0351549 A1 Nov. 27, 2014

Related U.S. Application Data

(63) Continuation of application No. 13/354,892, filed on Jan. 20, 2012, now Pat. No. 8,832,674.

(60) Provisional application No. 61/446,442, filed on Feb. 24, 2011.

(51) Int. Cl.
G06F 9/45 (2006.01)
G06F 12/02 (2006.01)
G06F 9/455 (2006.01)

(52) U.S. Cl.
CPC ........ *G06F 12/0253* (2013.01); *G06F 9/45504* (2013.01); *G06F 12/023* (2013.01); *G06F 2212/702* (2013.01)

(58) Field of Classification Search
None
See application file for complete search history.

(56) References Cited

U.S. PATENT DOCUMENTS

| 8,832,674 B2 * | 9/2014 | Harris et al. ................. 717/163 |
| 2002/0055929 A1 | 5/2002 | Kolodner et al. |
| 2012/0222005 A1 | 8/2012 | Harris et al. |

OTHER PUBLICATIONS

Bailey, Chris, "Java Garbage Collection Best Practices for Sizing and Tuning the Java Heap," IBM Software Group, http://www-01.ibm.com/support/docview.wss?uid—swg27013824&aid-1 (55 pages) [retrieved Jan. 22, 2014].

(Continued)

*Primary Examiner* — Chuck Kendall
(74) *Attorney, Agent, or Firm* — Nixon & Vanderhye PC

(57) ABSTRACT

Certain example embodiments relate to a highly-concurrent, predictable, fast, self-managed, in-process space for storing data that is hidden away from the garbage collector and its related pauses. More particularly, certain example embodiments relate to improved memory management techniques for computer systems that leverage an off-heap direct-memory data store that is massively scalable and highly efficient. The off-heap store may be provided in connection with a Java-based environment, and garbage collection may be completely or nearly completely avoided for the off-heap store. The off-heap store may be integrated into a tiered storage solution in certain example embodiments.

27 Claims, 13 Drawing Sheets

(56) References Cited

OTHER PUBLICATIONS

Krill, Paul, "Azul Systems Searches for Managed Runtime Breakthroughs," InfoWorld, Jun. 15, 2010, http://www.infoworld.com/d/developer-world/azul-systems-searches-managed-runtime-breakthroughs-228 (3 pages) [retrieved Jan. 22, 2014].

Rymer, John, "Why I'm Worried About Java's Future," Forrester Research, Jun. 21, 2010, http://blogs.forrester.com/john_r_rymer/10-06-21-why_im_worried_about_javas_future (7 pages) [retrieved Jan. 22, 2014].

Ragozin, Alexey, "How to Tame Java GC Pauses? Surviving 16iB Heap and Greater," DZone JavaLobby, Jun. 28, 2011, http://java.dzone.com/articles/how-tame-java-gc-pauses (11 pages) [retrieved Jan. 22, 2014].

"Java Heap Size," Azul Systems: Java for the Real Time Business, http://www.azulsystems.com/technology/java-heap-size (6 pages) [retrieved Jan. 22, 2014].

Memory Management in the Java Hotspot™ Virtual Machine, Sun Microsystems, Apr. 2006 (21 pages).

"Azul Pauseless Garbage Collection Providing Continuous, Pauseless Operation for Java Applications," Azul Systems, (17 pages) [retrieved Jan. 22, 2014].

* cited by examiner

OFF-HEAP DIRECT-MEMORY DATA STORES, METHODS OF CREATING AND/OR MANAGING OFF-HEAP DIRECT-MEMORY DATA STORES, AND/OR SYSTEMS INCLUDING OFF-HEAP DIRECT MEMORY DATA STORE

CROSS-REFERENCE TO RELATED APPLICATION

This application is a continuation of application Ser. No. 13/354,892 filed Jan. 20, 2012, which claims the benefit of Provisional Application No. 61/446,442 filed Feb. 24, 2011, the entire contents of each of which are hereby incorporated by reference in this application.

FIELD OF THE INVENTION

Certain example embodiments described herein relate to improved memory management techniques for computer systems. More particularly, certain example embodiments described herein relate to improved memory management techniques for computer systems that leverage an off-heap direct-memory data store that is massively scalable and highly efficient. In certain example embodiments, the off-heap store is provided in connection with a Java-based environment, and garbage collection is completely or nearly completely avoided for the off-heap store.

BACKGROUND AND SUMMARY OF EXAMPLE EMBODIMENTS OF THE INVENTION

Data requirements are estimated to be growing at an annual rate of 60 percent, and this trend is driven further by cloud computing platforms, company consolidation, huge application platforms (like Facebook), etc. Server-class machines purchased this year have a minimum of 8 gigabytes (GB) of RAM and likely have 32 GB or RAM. As one example, Cisco is now selling mainstream Unified Computing System (UCS) boxes with over 380 GB of RAM. As another example, users can borrow 68.4 GB machines for $2/hour on EC2.

In a common approach, many operating systems attempt to speed up operations by caching data on a local machine, e.g., in connection with the machine's heap. "Moving" data closer to the application that executes on it can result in efficiency gains. This conventional thinking oftentimes leads to the conclusion that the cache should be as large as possible. However, applications that execute on garbage-collected runtimes face an increasing challenge to handle the ever-increasing amounts of data and leverage the fast-growing amount of RAM on modern computer systems. As is known, garbage collection is a part of automatic memory management implemented, for example, by Java. Garbage collection involves determining which objects can no longer be referenced by an application, and then reclaiming the memory used by "dead" objects (the garbage). But complexities arise in determining when, for how long, and how often, garbage collection activities are to take place, and this work directly impacts the performance and determinism of the running application.

Furthermore, an unfortunate side-effect of increasing the size of the cache for garbage-collected runtimes is that with the large heaps needed for large caches, Java-based environments slowdown at an exponential rate with much, if not all, of the slowdown being directly attributable to Java's garbage collection. A heap size of 2-4 gigabytes (GB) oftentimes is manageable, and some further amount can be considered usable if specialized modifications are made. But custom modifications may be time consuming and technically challenging. There therefore oftentimes is a practical (and oftentimes recommended) 6 GB limit to Java heaps, although slowdowns frequently occur well before this maximum is ever reached. Slowdowns can halt all or substantially all processes that are executing. For large heaps, it is not uncommon to observe a 10 second delay in which nothing happens, although minute-long delays are not unheard of. These sorts of delays can be particularly problematic for web services, mission critical applications, and/or the like.

Challenges result from the increasing garbage collection pauses or delays that occur as runtime heaps become larger and larger. These delays may be unpredictable in length and in occurrence. Thus, as the data/memory explosion is occurring, the amount of the heap a garbage-collected runtime process can effectively use has stayed largely unchanged. In other words, although the amount of space available is growing, it oftentimes is challenging to use it in an efficient and cost-effective way.

These problems manifest themselves in several ways and can be caused in several common scenarios. A first problem relates to applications running too slowly. For example, an application might not be able to keep up with the users (e.g., with 10s of GBs of data in a database, the application may be overloaded and/or too slow to service the needs of users), which may be caused by the complicated nature of queriers, the volume of those queries, and/or the like. Caching may help by moving data "closer" to the application, but too many Java garbage collection pauses may be incurred if the cache is grown too large (e.g., to approximate the 16 GB of RAM in a hypothetical system).

Another common problem relates to unpredictable latencies that can affect the application. An application might be sufficiently fast on average, but many pauses that deviate from the mean may be unacceptable to my users. Service Level Agreements (SLAs) may not be met because of the size of my heap, combined with Java garbage collection pauses.

Still another common problem relates to complicated software/hardware deployment. It may be possible to "solve" the Java garbage collection problems, e.g., by running with many Java Virtual Machines (JVMs) with heap sizes of 1-2 gigs. Data can be partitioned and/or load balancing can be performed to achieve the performance and availability desired. However, setup may be complicated to manage because so many JVMs are needed, and checks must be performed to ensure that the right data is in the right places. Thus, while 64 GB of RAM can be filled, it nonetheless may be too hard to manage and too fragile to be implemented reliably.

Currently, users are forced to select one of three options when dealing with Java applications. The base case involves a small heap JVM on a big machine. Recognizing that garbage collection pauses are a problem, garbage collection is reduced by implementing, e.g., a 4 GB JVM on a 32 GB machine. Development and operational complexity is low, but performance may suffer. A second option involves implementing a large heap of, for example, up to 31 GB in a 32 GB machine. While the intention is to move the data closer to the application, the garbage collection delays can be extremely high and very complicated to manage. Development and operational complexity also may be very high.

A third option involves stacked, small JVM heaps. For example, eight 4 GB JVMs may be implemented. This approach is oftentimes used in combination with various sharding, load balancing, and clustering techniques. Unfortunately, however, it is very complicated to manage this environment. Availability problems also can be encountered if all or most of the nodes garbage collect at the same time.

Thus, it will be appreciated that there is a need in the art for alleviating the problems faced by garbage-collected runtimes. It also will be appreciated that there is a need in the art for systems that are able to handle increasing amounts of data in a manner that makes use of the growing amount of memory (RAM or disk) in computer systems.

These example problems mentioned above were present in the very first Java release and have not been fully addressed since then. Thus, it will be appreciated that there has been a long-felt need in the art for solutions to these and/or other related problems.

It is believed that part of the reason for the long-felt need is that prior attempted solutions have tried to rely on either operating systems (OS) approaches, or programming language (PL) approaches, for solving these and related problems. The inventors of the instant application have realized, however, that what is needed is a more holistic approach that blends in elements from both of these art areas. Thus, as explained in much greater detail below, the example embodiments described herein belong to an art area that is neither OS-related nor PL-related but instead can be viewed as something above both OS and PL (or managed runtime) layers.

More specifically, it will be appreciated that it would be desirable to provide a stand-alone caching solution is capable of holding a large dataset (e.g., from 10s to 100s of GBs) in memory without impacting garbage collection. The more data that is cached, the less that the application has to go to the external data source and/or disk and, thus, the faster the application will run. In a similar vein, it would be desirable to provide fast execution that meets SLAs, and that also stays fast over time. This can be achieved by reducing the amount of fragmentation and avoiding or at least reducing slowdowns as the data is changed over time. It also would be advantageous to provide an approach that is concurrent such that, for example, it scales with CPU numbers and powers, and the number of threads, while also avoiding or reducing lock contention. The solution advantageously would be predictable. It also would be advantageous to provide an approach designed to work with the programming language and/or operating system environment (e.g., providing a 100% Java solution to work within a JVM). This may help with snap-in functionality that does not introduce a large amount of complexity. It also would be desirable to provide a restartable solution, as a big cache may otherwise take a long time to build.

Most people incorrectly think that collecting dead objects takes time, but it is the number of live objects that actually has the greatest effect on garbage collection performance. As the Java heap becomes occupied with an increasing number of live objects, full collections occur more often and will each require more time to complete. The result is an increasing number of stop-world pauses in an application, for increasing lengths of time. In general, the larger the heap, and the more occupied it becomes, the greater the latencies in the application. Certain example embodiments help to avoid large, occupied heaps typical of large data caches while also reducing garbage collection related pauses.

One aspect of certain example embodiments relates to a highly-concurrent, predictable, fast, self-managed, in-process space for storing data that is hidden away from the garbage collector and its related pauses. In certain cases, the space may be self-tuning, and may connect to frameworks in ways that require no or substantially no changes to a user's application code. In this regard, in certain example embodiments, the space may "sit behind" standard interfaces such as, for example, Map, HttpSessions, Ehcache, and/or the like.

Another aspect of certain example embodiments relates to techniques that add scale-up features (e.g., the ability to improve performance by growing an individual machine) and predictability to servers and applications in the context of, for example, a clustering technology that provides high-availability scale-out (e.g., the ability to bring multiple connected machines to bear on a problem) for applications.

An advantage of certain example embodiments relates to the ability to integrate such functionality without having to change user code, and instead by adding a line of configuration and, potentially, a provided code module for referencing an off-heap store. This may, in turn, layer in a predictable, fast, highly-concurrent, off-heap store for garbage collected runtimes, without a significant amount of required tuning. By adding in an off-heap data store in accordance with certain example embodiments, the runtime's garbage collector can focus on a small heap needed for operations (which is something runtimes are very good at), while possibly leaving the rest of the data structures to be efficiently and completely (or substantially completely) managed by the off-heap store.

Another aspect of certain example embodiments relates to the ability to shrink the heap size and grow the cache.

Still another aspect of certain example embodiments relates to the possibility of providing fast swaps to disk and quick restartability.

In Java, off-heap memory is provided by the operating system (OS) via the java.nio.buffer.ByteBuffer class. Creating and destroying "direct" ByteBuffers ordinarily fragments the OS memory and makes off-heap memory allocation slow and unpredictable. To help avoid this situation, when certain example embodiments first start executing (e.g., at construction time), direct BBs are created that take up the entire off-heap memory space. Certain example embodiments then use their own memory manager to manage the ByteBuffers. Because the ByteBuffers are never destroyed (at least not until the Java process is completely done with them), the OS memory manager is never invoked. As a result, off-heap memory allocation is faster and more predictable.

Certain example embodiments include a memory manager that enables fast and predictable allocation. For example, allocation is performed in variable-sized chunks. The required amount of memory is requested from the OS in chunks as large as possible, and bounds on the chunk sizes are specified at construction. Allocation then proceeds starting at the upper bound. On an allocation failure, the bound size is reduced, and allocations continue at the new lower value, possibly until a lower threshold is met or surpassed.

The memory manager of certain example embodiments may allocate memory from direct ByteBuffers as Pages, with each Page being sourced from a single ByteBuffer. If appropriate space is not available, then an in-use Page may be "stolen" and used for the requested allocation. Each Page allocation request may include parameters such as, for example, thief, victim, and owner. The thief parameter may indicate whether an in-use Page should be stolen (if necessary) to meet the allocation request. The victim parameter may indicate whether this Page (after being allocated) should be stolen (if necessary) to meet another allocation request. The owner parameter may indicate an owner of this Page so that the owner can be notified if the Page is later stolen. The thief parameter and the victim parameter can be Boolean (true/false, yes/no, etc.) values, or numeric values that indicate relative priority in different embodiments.

In certain example embodiments, a computer system comprising at least one processor is provided, A non-transitory computer readable storage medium tangibly stores data. A software application is executable by the at least one processor and programmed to make use of the data. Off-heap memory is dynamically allocated and directly managed by a memory manager, such that the off-heap memory is perceivable by the software application as being a part of local application tier memory and manageable, after initial allocation, independent of any memory managers of the computer system and any memory managers of an operating system running on the computer system. The off-heap memory is scalable up to a size of the computer system's memory, upon direction from the memory manager, to accommodate terabytes-worth of data so that that data stored in the off-heap memory is transparently providable to the software application from the off-heap memory within microseconds and without having to repeatedly access that data from the non-transitory computer readable storage medium.

In certain example embodiments, there is provided a method of managing memory of a computer system including at least one processor, a non-transitory computer readable storage medium tangibly storing data, and a software application executable by the at least one processor and programmed to make use of the data. An off-heap direct memory data storage area is dynamically allocated and directly managed, using a memory manager, such that the off-heap direct memory data storage area is perceivable by the software application as being a part of local application tier memory and manageable, after initial allocation, independent of any memory managers of the computer system and any memory managers of an operating system running on the computer system. The off-heap direct memory data storage area is scalable up to a size of the computer system's memory, upon direction from the memory manager, to accommodate terabytes-worth of data so that that data stored in the off-heap direct memory data storage area is transparently providable to the software application from the off-heap memory within microseconds and without having to repeatedly access that data from the non-transitory computer readable storage medium.

The method may operate in connection with a Java-based environment, and may further comprise: (a) attempting to allocate Java byte buffers in chunks of a preconfigured maximum size in response to a request for off-heap direct memory data storage at a predetermined maximum size; (b) repeating said attempts to allocate byte buffers until the off-heap direct memory data storage area is created at the predetermined size, or until an attempt fails, whichever comes first; (c) when an attempt to allocate byte buffers fails, reducing the preconfigured maximum size and repeating (a)-(b); (d) receiving a request for a region of the off-heap direct memory data storage area, the region having an associated size; (e) finding, via a page source, an unused slice of the off-heap direct memory data storage area; (f) returning a page indicative of the unused slice, the page being a wrapped byte buffer that includes a reference to the slice where data is to be stored and a reference to an allocator object that created the slice; (g) continuing to return pages until the off-heap direct memory data storage area is exhausted; (h) managing the returned pages from the off-heap direct memory data storage area as a single coherent logical address space storing data keys and values, with a single page in the off-heap direct memory data storage area storing a hash table with metadata information linking data keys to values; and optionally (i) expanding and contracting the hash table in response to further entries being added thereto and removed therefrom, respectively, by rehashing into a new page.

In certain example embodiments, a computer system is provided. A plurality of computer nodes are provided, and an application is executable across the plurality of computer nodes in a Java Virtual Machine (JVM) environment. Each computer node comprises at least one processor; memory management software; and an off-heap direct memory data storage area dynamically allocated and directly managed by the memory management software of the associated computer node, with the off-heap direct memory data storage area being scalable upon direction from the memory management software of the associated computer node to accommodate terabytes-worth of data so that that data stored in the off-heap direct memory data storage area is providable therefrom without having to repeatedly access that data from a non-transitory computer readable storage medium or a network storage location.

In certain example embodiments, a system is provided. An application is executable on at least one computer. A server array of independently scalable coordinated memory managers and associated data storage nodes also is provided. Each said data storage node comprises a non-transitory computer readable storage medium tangibly storing data usable by the application. Each said memory manager comprises: at least one processor, and off-heap memory dynamically allocated and directly managed by the memory manager. The off-heap memory is scalable upon direction from the memory manager to accommodate terabytes-worth of data so that that data stored in the off-heap memory is providable from the off-heap memory without having to repeatedly access that data from the non-transitory computer readable storage medium of the node. The at least one computer includes program logic configured to automatically initiate a request for data from the server array when required data is not present in cache on the at least one computer, the request being transparent to the application.

According to certain example embodiments, the at least one computer may include a plurality of computers and the application may be executable across the plural computers.

According to certain example embodiments, each said computer may have its own memory manager for creating and managing an off-heap direct memory storage area thereon. For instance, according to certain example embodiments, each computer may include at least one processor; memory; computer-specific memory management software; and computer-specific off-heap direct memory data storage area dynamically allocated and directly managed by the computer-specific memory management software of the associated computer, with the computer-specific off-heap direct memory data storage area being scalable upon direction from the computer-specific memory management software of the associated computer to accommodate an amount of data up to the size of the memory of the associated computer.

It also is noted that certain example embodiments relate to methods of operating the various systems, memory managers/memory management software components, etc.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

As shown in FIG. 12, at L1, an Ehcache library may be present in each application, and an Ehcache instance, running in-process, sits in each JVM;

DETAILED DESCRIPTION OF EXAMPLE EMBODIMENTS OF THE INVENTION

Figure 1:
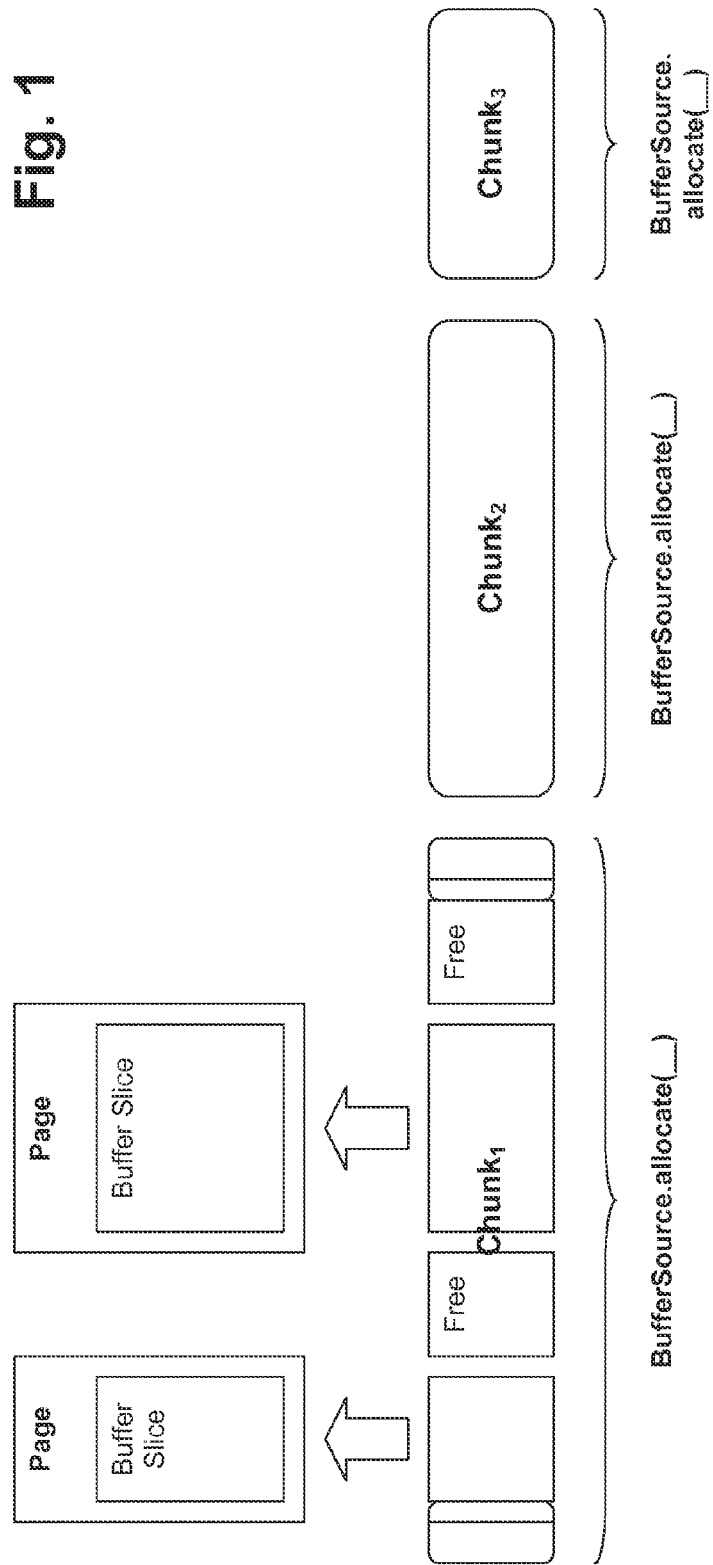
FIG. 1 is a simplified view of successive ByteSource allocations in accordance with an example embodiment.

One aspect of certain example embodiments relates to a highly-concurrent, predictable, fast, self-managed, in-process space for storing data that is hidden away from the garbage collector and its related pauses, e.g., in a Java-based environment. In certain cases, the space may be self-tuning, and may connect to frameworks in ways that require no or substantially no changes to a user's application code. In this regard, in certain example embodiments, the space may "sit behind" standard interfaces such as, for example, Map, HttpSessions, Ehcache, and/or the like.

When the off-heap direct-memory data storage techniques of certain example embodiments are implemented in connection with Java, ByteBuffers and BufferSources may be used in non-conventional and unexpected ways that for which they are not designed. That is, in certain example embodiments, Java ByteBuffers may be used for persisting data in off-heap storage in a less transient manner than otherwise would be expected. Treating ByteBuffers as if they were memory and then, further, managing them as such, is believed to be a novel feature of certain example embodiments.

The inventors of the instant application have realized that elements stored in a cache have a simple lifecycle that is serializable. By moving cached data outside of the heap and managing the cache manually, it possible to avoid the problems associated with garbage collection. While some problems are solved by adopting this approach, however, others are created.

A first problem relates to the fact that Java was not designed to work with memory off-heap (also sometimes referred to as direct memory). Therefore, it would be desirable to interact with operating system (OS) memory management modules as little as possible in an effort to try to overcome this issue with the way that Java was designed and implemented. In certain example embodiments, as much memory as possible is allocated upfront, which may be limited on the upper end by the size of cache desired or limitations of the system. Off-heap or direct memory can provide very large caches with very fast and consistent response times.

A second problem arises, however, in trying to determine how these allocations are to be made. In general, it is desirable to allocate chunks of memory that are as large as possible. In general, the bigger the chunk, the bigger the slice thereof that can be allocated and the lower the fragmentation that will occur within each chunk. In certain example embodiments, an initial request for a chunk is made with a predefined upper bound (e.g., 1 GB). Chunks are allocated in this way until they cannot be allocated anymore. Once a fail condition occurs (e.g., once a request for a maximum size request is denied), which may occur for example upon the very first request, the size of the request may be scaled back in some well defined way. For example, in certain example embodiments, the size of request may be reduced by half until allocations can again be made. In certain example embodiments, it may be desirable to set a lower bound for chunk sizes, as it may not be worth it to page with small chunks.

In certain example embodiments, it may be desirable to time how long allocations take. If an allocation or if allocations (e.g., on average, in the aggregate, based on some number of individual allocations exceeding a threshold, etc.) is/are taking to long, the allocation process may be halted. Lengthy allocation time can signal the type of resource over-committing that might eventually bring down a computer or computer system. For instance, a Linux kernel might take down large processes unexpectedly to account to try to accommodate the allocation process. One of the most likely candidates to be taken down, however, is likely the application that is attempting to leverage the off-heap store because it might appear as the most resource-intensive application running.

A third problem relates to balancing how things work internally within the off-heap storage. In certain example embodiments, each page may be sourced from a single byte buffer, with the size of a page potentially being tied to the size of a corresponding Java ByteBuffer. Page stealing may then be implemented. Any time a page is allocated, certain parameters including whether the requestor is a thief, victim, or owner may be passed. As explained below, these parameters may advantageously help establish a priority regarding who can steal what, when. Multiple caches may be implemented in certain example embodiments, and page stealing may also make it possible to balance how the various caches are being used. A thief, in theory, could steal from its own cache or others' caches. This provides a flexible approach to memory management.

A more detailed description of how certain example embodiments may be configured to operate will now be provided. As indicated above, in certain example embodiments, storage may be represented as ByteBuffer instances. In the context of a Java implementation, for example, storage may be represented at its lowest level as java.nio.buffer.ByteBuffer instances. Within the code, ByteBuffers may be generated by BufferSources.

Two types of BufferSources may be used within certain example embodiments, namely an OffHeapBufferSource type and a HeapBufferSource type. The OffHeapBufferSource type may provide access to ByteBuffers whose storage resides outside the Java heap. In Java, these are referred to as "direct ByteBuffers". This type of BufferSource is the kind used almost exclusively in production (e.g., in a non-testing environment). The HeapBufferSource type may provide access to ByteBuffers whose storage resides within the Java heap. ByteBuffer instances created through these sources are backed by regular in-heap Java byte array instances. This type of source is generally only used in testing scenarios.

Because BufferSource itself is an interface, it becomes possible to use more complex implementations that may perform more complex operations when a request is made to create a ByteBuffer. For example, in certain example embodiments, it is possible to allow fallback from off-heap to on-heap buffers when off-heap allocations fail.

The allocation of ByteBuffers directly from the Java runtime is generally an expensive operation for a number of reasons. For example, allocation typically requires a call to the underlying operating system. Because the underlying OS is not a garbage-collected environment, it oftentimes is the case that more work is done during allocation to reduce the likelihood of memory fragmentation. Additionally, direct buffer allocation is often synchronized at a virtual machine (VM) wide level and, thus, it is not concurrent. Further, it can sometimes require forced garbage collection invocation (e.g., Sun VMs even have a 100 ms thread sleep-to-yield to the various reference processing threads). Still further, allocation performs enforced zeroing of the allocated memory for security reasons. Thus, those skilled in the art ordinarily might not see many clear advantages in the allocation of ByteBuffers directly, or might believe that the costs outweigh potential benefits of doing so.

In order to reduce the expense being incurred at potentially critical times, in certain example embodiments, storage requirements are not fulfilled by BufferSources directly. Instead, storage allocations are processed by PageSources, and the storage itself is returned as Page instances. Pages are wrappers around slices (subsections) of ByteBuffer instances, which also understand the concept of the Page being bound to an owner.

PageSource implementation may be accomplished using an UpfrontAllocatingPageSource type. In certain example embodiments, this may feature upfront ByteBuffer allocation, fragmentation-resilient Page allocation, and/or victim/thief stealing behavior.

As suggested by its name, the UpfrontAllocatingPageSource may perform all or substantially all BufferSource allocation calls at construction time. This may help ensure that all the expensive ByteBuffer allocations are complete by the time any regular allocation operations are performed on the page source. Because ByteBuffer allocation occurs at construction, the total amount of off-heap memory that will be required may be supplied at construction. This approach to allocation helps ensures that all of the required storage is reserved from the operating system (OS) and, hence, subsequent allocation failures become less likely. The pages allocated by these page sources may be allocated from a pool of much larger ByteBuffer chunks. Allocation of these chunks can proceed in one of several ways such as, for example, via allocation in fixed-sized chunks or allocation in variable-sized chunks.

In the allocation in fixed-sized chunks mode, the required amount of memory is requested from the OS in fixed size chunks (plus a possible differently sized trailing chunk). The chunk size may be supplied at construction, and failure to allocate sufficient chunks of this size may result in a failure to construct the page source itself.

In the allocation in variable-sized chunks mode, the required amount of memory may be requested from the OS in chunks as large as possible. Bounds on the chunk sizes may be specified at construction. Allocation then proceeds starting at the upper bound. The bound size is reduced on an allocation failure, and allocations continue at the new lower value. Should the allocation size fall below the lower bound on the chunk size before sufficient memory has been allocated, then the construction of the page source will fail. The amount of the reduction may be a predefined constant or other amount. For instance, in certain example embodiments, the requested chunk size may be cut in half upon each failure until allocation is complete or until an optional lower bound is passed, whichever comes first.

In certain example embodiments, the duration of each allocation may be monitored during both of the different allocation processes. Should allocation times (e.g., per unit memory) fall below an initial threshold, warnings may be issued to indicate the slow allocation condition. This kind of slowdown may sometimes be indicative of a large amount of OS page faulting activity. If allocation times fall below a second, more severe threshold, then the Java process may be terminated to avoid causing instability in the host machine.

Within the UpfrontAllocatingPageSource allocation, information is stored in a set of augmented AA trees. As is known, an AA tree is a form of balanced tree used for storing and retrieving ordered data efficiently. AA trees perform can perform many data rotations to achieve this balancing, but the relatively simple balancing algorithms tend to have fast execution times. AA trees tend to be relatively flat, which can result in faster search times. Of course, other data structures may be used in different example embodiments, and these data structures may be tree or other structures. In certain example embodiments, there is a single tree per ByteBuffer chunk, and the trees are augmented to act as a region set that stores the set of free regions within the associated chunk. Page allocations from within each chunk are constrained to be power-of-two sized and to be allocated at a granularity corresponding to their own size (e.g., an 8-byte page can only be allocated at an address that is a multiple of 8) in certain example embodiments. Of course, other powers can be used for the Page allocations, and/or other bit or byte sizes can be used to address correspondingly located addresses.

This example "defined-power" (e.g., power of two) approach may have certain advantages. For example, by constraining allocations in this way, it is possible to reduce the likelihood of fragmenting the chunk by generating oddly-sized holes within the chunk. As another example, by limiting regions to be power-of-two sized and ordering the tree (or other data structure) by address, it becomes possible to store the set of free areas found in each sub-tree in a simple bit mask. The lowest valid region can be found by performing a simple search against these bit-mask values, gradually finding the leftmost (lowest address) sub-tree containing a free area of sufficient size.

FIG. 1 is a simplified view of successive ByteSource allocations in accordance with an example embodiment. Three ByteSource allocations are made in the FIG. 1 example, with first, second, and third chunks being allocated. As will be appreciated from the FIG. 1 diagram, the chunks are differently sized, indicating that a first request for a first size was successful, but the size requested was reduced a first amount (through one or more requests for a reduced size chunk) to obtain the second chunk, and a second further amount (again, through one or more requests for a reduced size chunk) to obtain the third chunk. The first chunk is shown as having several free slices that could be used to store data. Two example buffer slices, however, are allocated using the PageSource approach described above. The Pages wrap these slices, making them accessible.

The UpfrontAllocatingPageSource may also provide an opportunity for page stealing. Allocation requests on the page source may have additional properties associated with them. A first property may be a Boolean, identifying whether or not a given page can be stolen. In order for a page to be stolen, an owner may be bound to it so that a callback can be made to the owner to ensure the safe recovery of the page.

A second property may be a thief index. Incoming allocations may be entitled to steal previously allocated victim pages if the victim pages' thief index is lower than their own. If there is not sufficient free space to complete the allocation, then eligible victim pages may be used to satisfy the allocation. This concept allows the different users of a page source to be ranked in order of importance so that less important data can be sacrificed in order to store more important data.

According to certain example embodiments, the OffHeapHashMap is a map implementation on which other off-heap maps and caches may be based. In some implementations, the OffHeapHashMap may be an open-addressing hash table implementation whose table is stored in an IntBuffer that is backed by a single Page. Re-probing within the hash table in such example implementations may be linear with a one slot step, e.g., with each entry being a four int (128 bit) struct. The following struct may be used in connection with certain example embodiments:

```
struct table_entry {
    bit used;
    bit removed;
    int30 metadata;
    int32 key_hash;
    int64 encoding;
}
```

The 30 bits of metadata space available here can be used to store additional information about the entry. The caches, for example, may use some of this space to store the eviction related data. Example eviction-related techniques are set forth in greater detail below. The OffHeapHashMap implementation also may provide hooks for performing custom operations on adding a mapping, retrieving a mapping, removing a mapping, table expansion failure, and/or storage engine failure.

The map's table may expand and contract as entries are added to and removed from the map. Failure to find an available slot within the table may result in either an increase in the re-probe limit (e.g., if the table has a low load factor); otherwise, the table may be expanded (e.g., to twice its size in certain example instances). If removal of an entry pushes the load factor of the table below a predetermined threshold, then an attempt may be made to shrink the table (e.g., to half its size). If this triggered shrink fails, then the subsequent shrinkage threshold may lowered (e.g., by half) to prevent repeated failed shrink attempts, possibly related to entry clumping.

The StorageEngine in certain example embodiments may be responsible for encoding a {key, value} pair for a mapping into a 64-bit quantity that can be stored in the associated OffHeapHashMap's table. The off-heap store infrastructure may support the use of specialized StorageEngine implementations to suit specific key and value types. Storage engines can be split into two example categories. In a first category, storage engines may encode the entire {key, value} pair inside the 64-bit encoding value. In a second category, storage engines may store the {key, value} pair in a secondary data structure, and use the encoding to store a "pointer" into the secondary data structure.

Key types are small and can often be fit inside the encoding. For instance, it is often possible to store both the key and a pointer to the value in a secondary structure inside the encoding space, resulting in a hybrid storage engine that is a combination of the above two types.

In certain example embodiments, the canonical generic StorageEngine implementation is the OffHeapBufferStorageEngine. This implementation may use a pair of Portability instances to convert the key and value objects into a byte array form. A basic Portability implementation can rely on regular Java serialization for this conversion. If the constraint on the input type is tighter, however, a more efficient scheme may be possible. An example would involve storing a byte array directly as itself, or storing a String as a byte array expansion of the underlying char array. Once the {key, value} pair is converted to byte arrays, they may be stored in the secondary data structure, and the "pointer" to the storage location may be returned to be stored in the map's table.

Instances of OffHeapStorageArea provide the means to aggregate multiple identically sized pages returned by a PageSource instance into a logically contiguous but physically disparate storage area. OffHeapStorageArea instances grow dynamically when necessary by allocating new pages from their associated PageSource.

These OffHeapStorageArea instances may be used as the secondary data structure in which the OffHeapBufferStorageEngine stores its newly portable key and value. They provide a simple addressable storage area in the off-heap to which integers and byte array values can be stored, and then retrieved. Internally, the storage area uses a modified Java port of a standard malloc and free algorithms (although other algorithms could be used in different example embodiments). Both head and tail boundary tags may be kept on the allocated areas so that it is possible to traverse both the allocated and free chunks in the reverse direction. This advantageously allows for an efficient implementation relating to the safe recovery of occupied pages on a steal request.

Figure 2:
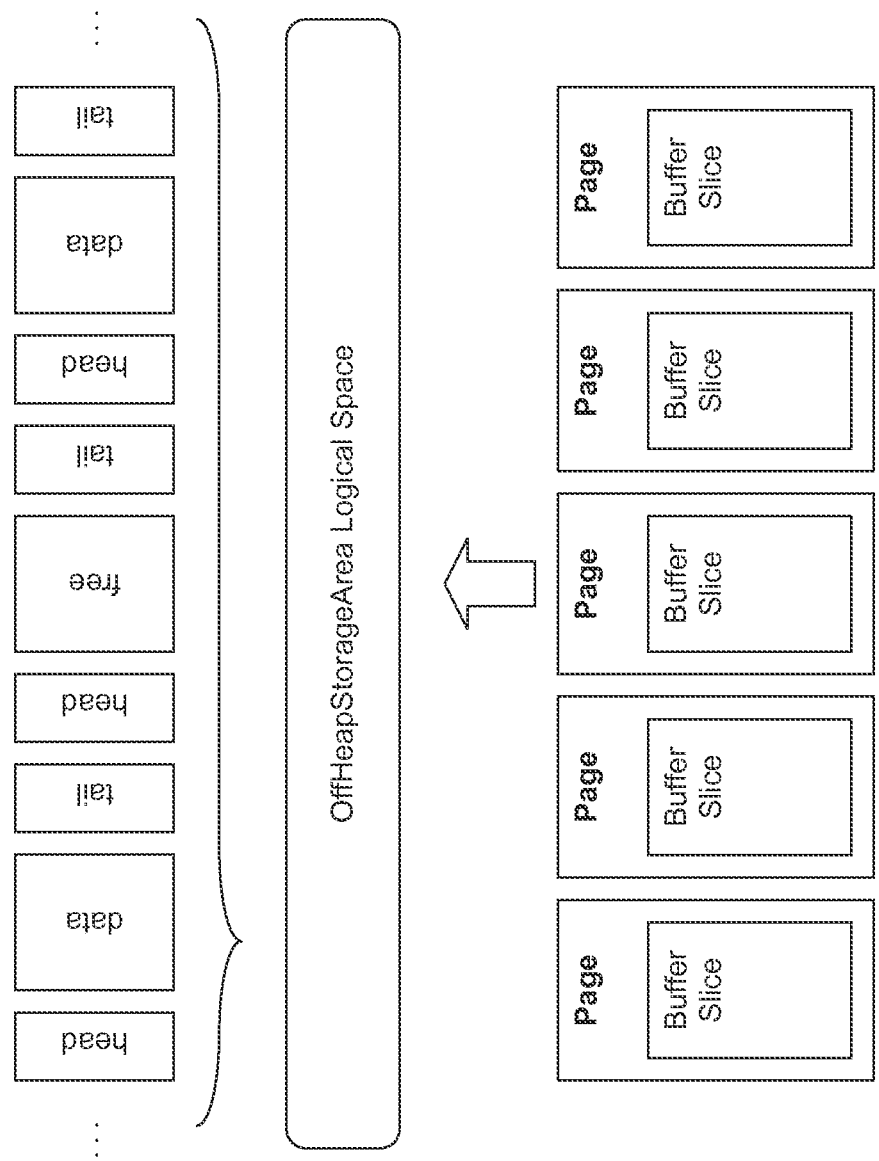
FIG. 2 shows how pages, including buffer slices, can be provided to an OffHeapStorageArea logical storage space in certain example embodiments.

In this regard, FIG. 2 shows how pages, including buffer slices, can be provided to an OffHeapStorageArea logical storage space in certain example embodiments. In FIG. 2, the OffHeapStorageArea logical storage space includes a plurality of data blocks and free blocks, with each being sandwiched between respective head and tail boundary tags. As shown in FIG. 2, Pages (containing buffer slices), comprise the OffHeapStorageArea logical space which, in turn, includes the tagged filled and free blocks.

Figure 3:
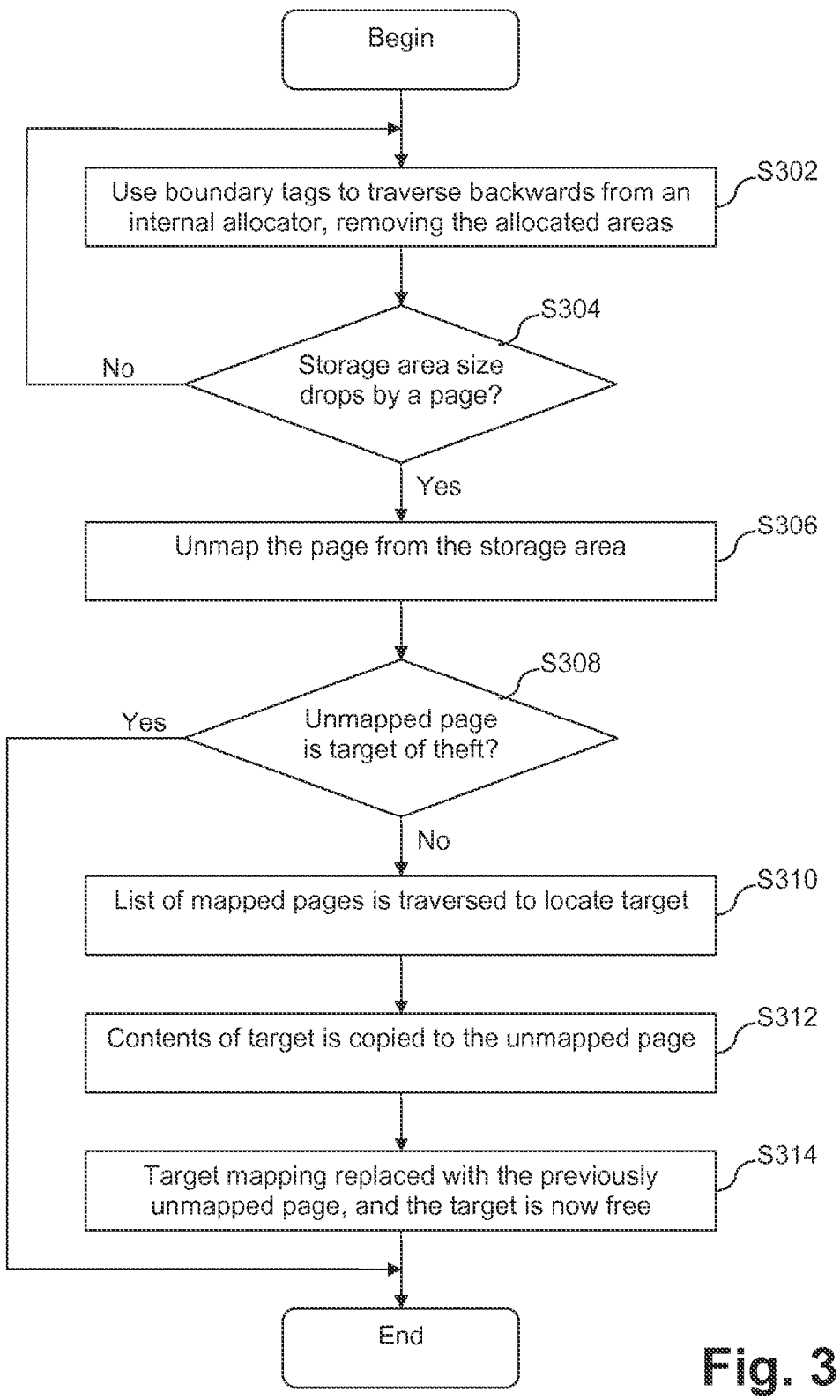
FIG. 3 is a flowchart illustrating an example process for stealing a page from an OffHeapStorageArea in accordance with certain example embodiments.

FIG. 3 is a flowchart illustrating an example process for stealing a page from an OffHeapStorageArea in accordance with certain example embodiments. In step S302, an internal allocator is traversed backwards using the boundary tags of the allocator, and the allocated areas are removed via the "removeAtAddress" callback to the storage area's owner. This repeats until the size of the storage area drops by a page, e.g., as determined by step S304. Once the desired drop has occurred, in step S306, the page is unmapped from the storage area. If the unmapped page is the target of the theft as determined in step S308, then the process is complete. If the unmapped page is not the target of the theft, however, then the list of mapped pages is traversed to locate the target in step S310. The content of the target is copied to the unmapped page in step S312. In step S314, the target mapping is replaced with the previously unmapped page, and the target is now free. The theft is complete.

It will be appreciated that this process advantageously allows previously used pages to be safely recovered from the storage area without the risk of concurrent use.

Concurrent and/or locked variants of OffHeapHashMap also are possible. Using the OffHeapHashMap, for example, standard data structure approaches may be used to produce an exclusively locked (hashtable like) map; a shared read, exclusive write map; a segmented, exclusive locked concurrent map; and a segmented, shared read, exclusive write concurrent map.

An off-heap cache may be considered distinct from an off-heap map in that an incoming "put" operation may be allowed to remove elements from the cache in order to succeed. Thus, in certain example embodiments, the map may be considered as having a higher priority than the cache. In an off-heap map, a request to "put" a value when no space is available will fail.

"Put" operations on the map can fail for several reasons. For example, the map's storage engine may not have enough free space in its secondary data structure to store the incoming {key, value} pair. To address this form of failure, it is possible in certain example instances to remove one or more mapping(s), as it is only necessary to free sufficient space in the storage engine's secondary data structure. Another source of failure relates to the map's table not having a free slot in which the given key can be stored. In this case, it may not be sufficient to simply remove any one or more {key, value} pair(s). Because the key can only hash to a slot within its re-probe sequence, a mapping for one of the keys within this sequence may be removed.

Eviction decisions in the off-heap store's cache implementation may be performed using a clock eviction scheme. The clock bit for the cache may be stored in a metadata area for each entry in certain example embodiments. On each cache access (via the previously mentioned OffHeapHashMap hook), the clock bit for the accessed mapping is set. On a storage engine failure, the clock hand can scan through the table resetting all set clock bits, stopping when an unset clock bit is found. The entry corresponding to the unset clock bit is then evicted from the cache. When a table resize fails (since, in order to be successful, an eviction should be made from within the incoming key's re-probe sequence), a different process can be followed. First, a regular eviction selection can be performed, and if the selected mapping falls within the re-probe sequence, then there is a success. If this is not true, then having advanced the clock hand and reset some clock bits, the clock bits within the re-probe sequence can be inspected, and the first entry with an unset clock bit can be picked. If there are not unset bits, an in sequence entry can be selected at random. One benefit of implementing a clock eviction scheme relates to speed. Of course, it will be appreciated that other eviction schemes (e.g., least recently used (LRU), least frequently used (LFU), etc.) could be used in different example embodiments.

In shared read caches, the clock information is updated under a read lock, updates to the clock information are allowed to propagate "racily" (e.g., race conditions are tolerated), and visibility of these clock data changes to subsequent evicting writer threads is guaranteed through the volatile write/read pair in the guarding ReentrantReadWriteLock.

In segmented caches, where the PageSource is shared between the segments, there is one eviction scenario that the above clock eviction scheme may not cover. It is possible that the PageSource shared by the segments is exhausted, yet despite having evicted all of its own elements, the target segment cannot complete the "put" operation. In this example scenario, for the "put" to succeed, pages must be released by the other segments. To accomplish this, the top layer map, which holds the references to all the segments, may initiate a shrinking operation on each segment. This operation, in turn, forces each segment to release some storage, and then the operation is reattempted. This process may continue until either the operation succeeds, or until all other mappings are purged and the operation still fails, at which point the mapping fails, it being too large to fit in the configured off-heap area. The shrinking may be accomplished in a similar manner to page stealing by requesting that each segment's underlying OffHeapStorageArea release its latest page, thereby removing the mappings that are stored in that page. Shrinking of the segment's table areas then occurs naturally as the mappings are removed.

Example Implementation for Server Arrays

In certain example embodiments, a server array (e.g., a hardware server array) may be responsible for storing the entire cluster state including the clustered object state, lock state, client object state, search index state, etc. It also may be responsible for retrieving and furnishing such information to the clients (L1s) when requested. Some operations such as, for example, Distributed Garbage Collection (DGC) may also rely on the information stored in the server array to operate.

The amount of information stored in the server array of certain example embodiments may be quite large and also may be proportional to the size of the data in the cluster, the number of nodes in the cluster, the number of active locks used in the cluster, the number of search indexes created in the cluster, etc. The server array of certain example embodiments may have the ability to push some of this information, like the clustered object state, to a persistent store when needed. The rest of the information may be stored in the heap for fast access in certain example implementations.

There are several issues with this approach, however. The information that is saved in the persistent store is slower to read, thereby potentially increasing the read latency of the application. As information is stored in the persistent layer, it may need to be updated as the state information changes. Thus, writes may have higher latency and lower throughput. As some information (e.g., the lock state and map state objects) is not in the persistent store, it may need to be stored in the heap. Accordingly, for larger data sizes with many nodes accessing them, more heap space may be needed to handle it. Garbage collection takes exponentially longer with bigger heaps. As the garbage collection pauses become longer and/or more frequent, it may become impractical to run with heaps larger than 6 GBs. This limits the size of the data that the server array can handle. Longer garbage collection pauses also may make it impossible to meet tighter SLAs (Service Level Agreements). Furthermore, the entire memory available in the machine may not be used by the server array.

Figure 4:
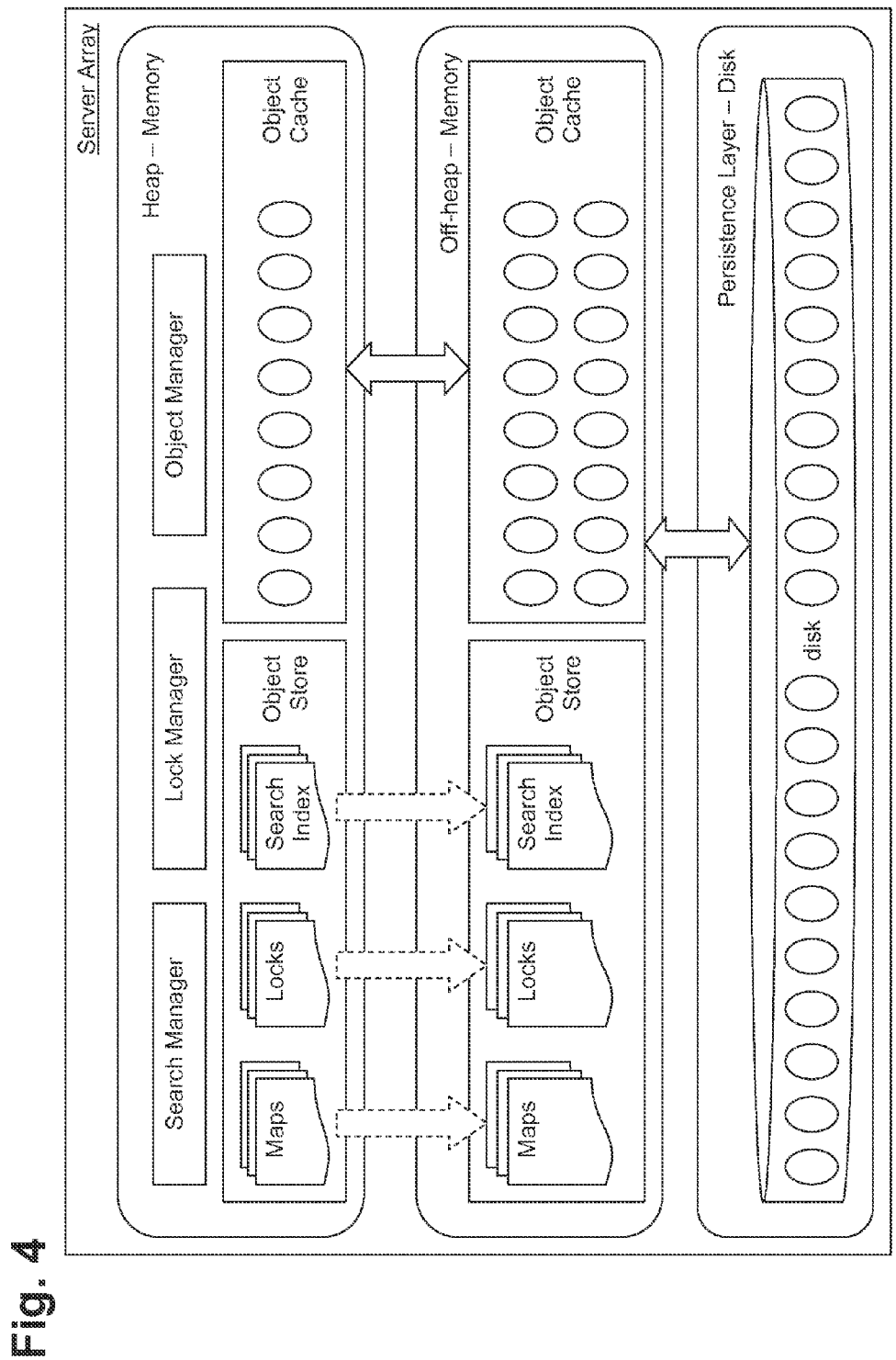
FIG. 4 is an example block diagram showing a server array suitable for use in certain example embodiments.

Despite their possible presence, these issues may be addressed at the server array in certain example embodiments. More particularly, the techniques of certain example embodiments may provide access to huge chunks of memory available to the machine that previously was unavailable. FIG. 4 is an example block diagram showing a server array suitable for use in certain example embodiments.

As is known, a cache stores data that is available elsewhere transparently in a faster medium or closer to the application for faster access. The techniques of certain example embodiments may be used to provide an off-heap cache for data objects, e.g., in the server array. The persistent store may be fronted, and data objects may be stored for faster access. In other words, the off-heap cache may sit between the more conventional heap (which may be implemented in transitory memory), and the persistent store (which may be implemented on a non-transitory computer storage medium such as, for example, a physical disk).

The server array may run in a persistent mode or in a temporary swap mode. In a persistent mode, clustered data may be written to disk to protect against server failure. In temporary swap mode, data may only be written to disk when there is no space for storing it in memory. Certain example embodiments therefore may work as an object cache in both modes, with example variations in their respective inner workings, e.g., as explained below.

In certain example embodiments, in the persistent mode, as the object state is changed, the state is written to both the off-heap cache and the persistent store. This may be done to help protect against server failure, power failure, or the like. If the heap is getting close to full, the objects in heap are removed. A copy of the object cached in the off-heap cache may be kept in persistent store (e.g., on disk). If the off-heap cache is full, then some of the least used objects in the off-heap cache may be selected through a heuristic and removed therefrom. A copy of these objects may be kept on disk so the state information is not lost.

When an object needs to be read, the object may be accessed from the heap. If it is not present there, then the off-heap cache may be checked and, lastly, the disk or the persistent store may be checked. When an object is only present in the persistent store and it is read, it may be faulted into the off-heap cache and/or the heap. Also, on every access of an object in off-heap cache, statistics may be updated so that when an eviction occurs, the least used objects are evicted from the off-heap cache.

In certain example embodiments, in the temporary swap mode, objects stay in heap until they are evicted because of a lack of space. When they are evicted, the state is written to the off-heap cache. Only when they get evicted from the off-heap cache are they written to the persistent store. Thus, the object state is resident in one of the heap, the off-heap direct memory, and the persistent store.

When the off-heap cache is full, objects therein are evicted therefrom. A notification of the evicted object results in persistence layer persisting the state to disk. Multiple objects may be persisted in batches to help achieve maximum or at least increased throughput from the persistence layer.

When an object is read, the object is accessed from the heap. If it is not present there, then the off-heap cache may be checked and, lastly, the disk or the persistent store may be checked. When an object is only present in the persistent store and it is read, it may faulted into the off-heap cache and/or the heap. Also, on every access of an object in the off-heap cache, statistics may be updated so that when an eviction occurs, the least used objects therein are evicted therefrom.

By using the techniques of certain example embodiments as an object cache in the server array, it may be possible to achieve faster read access to the data from the off-heap cache instead of going to the disk, faster writes to the data in temporary swap mode as data is returned to the off-heap cache instead of the disk when the heap is full, and/or the ability to use most of the available RAM in the machine.

A large amount of state information may be stored in the server array for enabling the servers to perform regular operations normally. Some of the state information that takes up a large portion of the memory may include, for example, map state objects, lock state objects, search index objects, client state objects, etc. These data structures in the server grow as the amount of data that the server manages grows. Certain example embodiments may, however, implement an off-heap store for storing such bookkeeping data structures that are required for day-to-day operation of the server.

A map interface may be implemented in certain example embodiments to transparently store these bookkeeping data structures in the off-heap cache. On "put" operations into the map, the key and the value is transparently serialized and stored in the off-heap. On "get" operations from the map, the data is de-serialized and read from the off-heap cache. Optimized serializers may be implemented to store longs as keys, off-heap. The users of these interfaces may be unaware of the fact that the data is transparently stored and read from off-heap locations. Additional such interfaces like lists, queues, sets, and/or the like may be implemented to transparently store data off-heap.

This may advantageously enable smaller heap size for larger data sets, increased usage of all available memory at the server, reduced garbage collection pauses and/or more predictable garbage collection activities, and/or the ability to meet more stringent SLAs with lower latency and higher throughput numbers.

As the data that is stored in the off-heap store is not available from anywhere else unlike the data in off-heap cache, the off-heap store may not be allowed to evict any of this data. One big chunk of off-heap memory may be allocated and managed internally between the store and the cache. Based on the amount of memory that is allocated to the server array and based on the data and usage pattern, both the store and the cache may expand and shrink as needed or desirable. When all of the memory that is allocated to off-heap is full, then the cache starts evicting objects to fit new objects. If the store needs more memory to expand and store new entries, then objects are evicted from the off-heap cache to make space for the store to expand.

There are a number of possible enhancements that may be possible in connection with certain example embodiments. For example, in certain example embodiments, only map state objects are stored in the off-heap store. In other embodiments, however, more states (e.g., lock state, search index state, client state, etc.) can be stored in the off-heap store. Additional interfaces like list, set, and queue interfaces to the off-heap store may be implemented to help transparently store various data structures in off-heap areas. Similarly, special purpose serializers may be built to help avoid copying of byte arrays during serialization and deserialization of data, thus helping to avoid extra garbage creation.

Certain example embodiments provide a high density solution (e.g., up to 1 TB per node or higher), whereas some current solutions scale to only about 32 GB per node. In a similar vein, the cache of certain example embodiments may be used by millions of applications, as compared to some current approaches that support only several thousands of applications.

Example Implementation for Ehcache

As an extension to Ehcache, certain example embodiments may use a concurrent, shared read, exclusive write off-heap cache as an intermediate tier between the existing in-memory (on-heap) and on-disk tiers. Thus, it will be appreciated that certain example embodiments may relate to tiered caching techniques.

"Put" operations on the cache may populate the off-heap and on-disk tiers, and "putting" to the in-memory tier may be attempted if the write is to a key already in the in-memory tier (e.g., the key is an existing member of the hot-set such as when it is frequently accessed) or if the in-memory tier is currently below its maximum size. This may help reduce bulk loading of the cache causing constant activity in the in-memory eviction (since "putting" new entries can involve eviction of old ones when at threshold), while still preserving the in-memory nature of existing hot-set keys during normal operation.

Cache retrievals may initially look in the in-memory tier. If this lookup is unsuccessful, then the off-heap tier may be consulted. And if that fails, the on-disk tier finally may be checked. If a matching entry is found, then every tier may be populated with the accessed entry, and the necessary evictions of unused elements occur.

Figure 5:
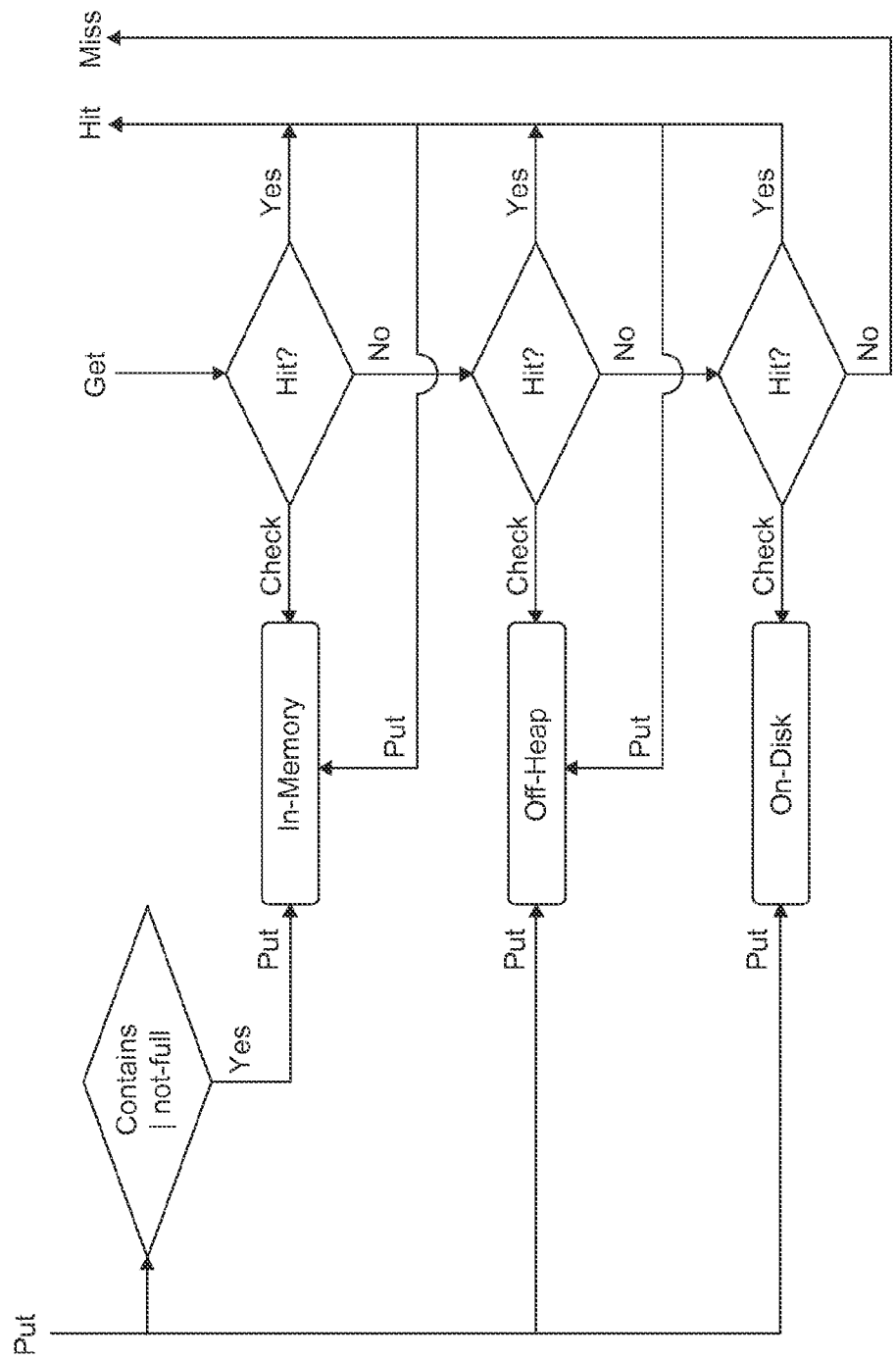
FIG. 5 is an example flow diagram that shows the multi-tiered caching approach of certain example embodiments.

FIG. 5 is an example flow diagram that shows the multi-tiered caching approach of certain example embodiments. As can be seen from FIG. 5, put and get operations check successive tiers, in order, to determine whether the tiers are not full or contain the data, respectively. A hit at the first available tier ends the put or get process, whereas a miss at a given level moves the check to the next tier down, until no more tiers exist.

In order to keep pace with the large storage capacity of the off-heap store tier of the Ehcache instances, an equivalent disk store implementation may be provided. In certain example embodiments, this may reuse the same map functionality as the off-heap stores, but back everything using a single file. This is achieved using adaptations to the existing off-heap stores.

First, a PageSource may be used for the OffHeapHashMap instances which, rather than creating pages backed by direct ByteBuffers (that are ultimately backed by RAM), creates MappedByteBuffers that are backed by sections of a memory mapped file. These memory-mapped sections may be buffered in RAM by the OS, but still may be ultimately backed by the underlying file.

Second, a custom StorageEngine implementation that is backed by the same file may be used, but the custom PageSource may be used to allocate space within the file in which to store the keys and values. Internally, the FileBackedStorageEngine may use an exponentially expanding series of reserved file chunks to store the keys and values. Initially, the storage engine may start with a given size chunk (e.g., 64 kb). Once this chunk is filled, an additional chunk may be allocated that is twice the size (e.g., 128 kb), and so on as the storage expands. These regions may be reserved through the page source to reduce the likelihood of the engine and table from concurrently using the same sections of the file. This exponentially expanding chunk size also reduces the likelihood that the number of chunks required for a given disk store size will rise too far which, in turn, may help reduce the likelihood of the metadata associated with tracking the chunks occupying too much of the heap.

Within the storage engine, space may be allocated for the {key, value} pairs using an augmented AA tree that is similar to that used to allocate pages from the off-heap chunks. This approach may be used instead of an in-place algorithm so that the allocator information (which is frequently read and in a very "random" manner) can be kept in the low-latency area of the Java heap instead of the high latency area of the disk where such a "random" access pattern could cause severe issues with disk seek latencies. Some efficiency in disk space is sacrificed by rounding allocations to the nearest power of two. However, this approach has been found to significantly reduce the fragmentation that can occur in the disk storage. It is noted that the free space metadata is stored in the heap. Severe fragmentation of the on-disk free space would cause the size of the on-heap metadata to rise significantly.

Once space is allocated for the key, the actual disk write may be buffered in the heap, while a separate thread may asynchronously write the data to the allocated area on the disk. Requests to read while the write is still pending may be serviced by the in heap copy of the data.

Example Implementation for HttpSessions

Certain example embodiments may be used in connection with HttpSessions, e.g., to provide the ability to store http sessions in the off-heap cache described above. HttpSessions allows an application server to scale-up to billions of users instead of tens of thousands. As HttpSessions are created, they are either directly placed in the off-heap cache or stored in an on-heap cache to later be stored in off-heap when on-heap is full. Retrieval works by first checking the on-heap cache and, if there is a miss because the desired data is not there, attempting retrieval from the off-heap cache.

Thus, certain example embodiments may enable access to all of the RAM in a machine to a single garbage-collected process without the penalty associated with garbage collecting such huge memory on heap. Access to off-heap memory behind a standard cache interface in a garbage-collected runtime may be transparent. Similar to the above, access to off-heap memory may be provided through map, queue, list, and set interfaces to store regular serializable objects off-heap in a garbage collected runtime to reduce garbage collection pauses. The available memory in a garbage-collected runtime may be pre-allocated from the OS in chunks of off-heap memory and then managed internally. By managing and storing the data in segments and locking only parts of it for any given operation (such as, for example, write/update/remove/get/resize/etc.), the off-heap access may be highly concurrent across all threads accessing it. Certain example embodiments also may make it possible to use a combination of segmenting and C style space management techniques to create a pauseless or substantially pauseless off-heap map/list/queue/data structure.

The techniques of certain example embodiments make it possible to cache terabytes worth of data across several nodes in a computer system. Doing so, in turn, may allow millions of applications to execute simultaneously. Page stealing also becomes possible, even across a network environment.

Figure 6:
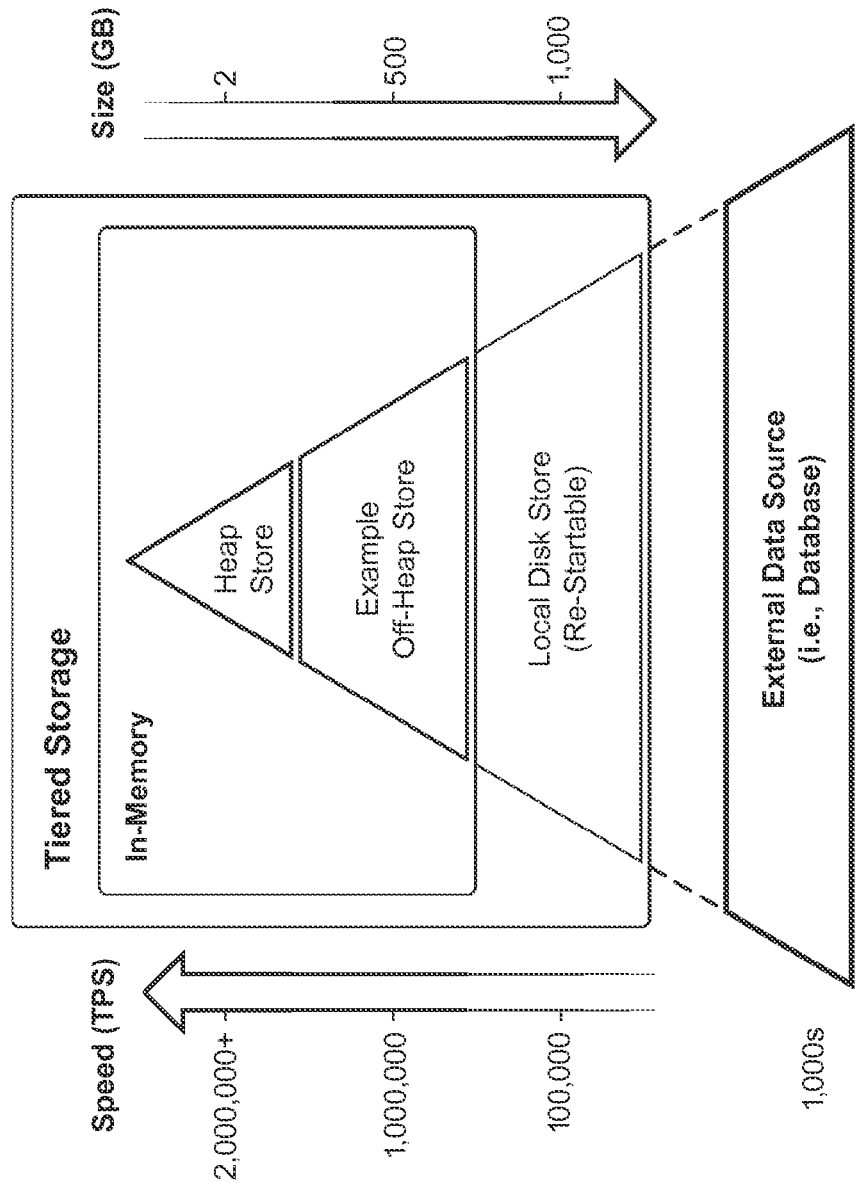
FIG. 6 is an example of a tiered storage approach that implements the off-heap direct memory cache of certain example embodiments.

FIG. 6 is an example of a tiered storage approach that implements the off-heap direct memory cache of certain example embodiments. Example speeds (in transactions per second) and possible storage sizes are shown in the FIG. 6 diagram. FIG. 6 is designed with an aim towards consistently storing data as close to the application code as possible, but without overloading the Java heap and its associated garbage collector. At the lowest layer, data is stored within an external database, which represents the slowest access times. Ehcache, for example, aims to eliminate as much access to this layer as possible to improve application performance. By contrast, the top-most layer represents the area within the Java heap that BigMemory keeps the most frequently used data, allowing for read/write latencies less than 1 microsecond. The layer immediately below the heap represents the in-memory cache of certain example embodiments and is slightly further away from the heap, but hidden from the garbage collector so that it is designed to avoid causing a pause in the JVM while it is resident there. It has been found that caches hundreds of gigabytes in size can be accessed in around 100 microseconds with no garbage collection penalties when the techniques of certain example embodiments are implemented.

For applications using the Terracotta Server Array as a distributed cache for Enterprise Ehcache, the techniques of certain example embodiments increase the memory available to each node in the server array. With more memory at the disposal of each Terracotta server node, a terabyte-scale distributed cache is delivered with a fraction of the number of nodes. It has been observed that the number of servers can be consolidated by a factor of four or more in real commercial deployments.

Further Example Interoperability Among and/or Between Network Components

Application scale requirements range from single-machine installations to very large, multi-datacenter and cloud deployments. As application usage grows, and more users send larger and larger waves of transactions through, the architects and operators of that application oftentimes find it challenging to increase capacity to meet that escalating demand. Achieving high-performance scalability for enterprise applications can be a costly problem and a complex challenge. Typical approaches require development-intensive application redesign, expensive database licenses, and high-end hardware.

At one end of the scalability continuum (e.g., applications that run on a single machine), adding capacity typically involves attempts to improve raw performance. Caching is usually the easiest and most effective way to reduce latency and increase throughput. A cache stores results that are relatively expensive or time-consuming to retrieve or compute so that subsequent work that relies on those results may complete without incurring the cost of repeated operations. Adding effective caching can improve application performance by orders of magnitude, sometimes with little code impact.

However, for applications that cache large amounts of data, traditional in-memory caching can be problematic in the Java Virtual Machine (JVM) because of long garbage collection pauses. Storing more data in memory requires a larger Java heap. As Java's heap grows, so do the demands on Java's garbage collector. Moreover, the unpredictable nature of garbage collection makes it especially hard to manage, as it is difficult and sometimes even impossible to predict when garbage collection will occur and how long it will last.

However, certain example embodiments may use Java's direct buffer API and a high performance memory manager to store cache data in memory, but off the Java heap where it is invisible to the garbage collector that otherwise would cause long and unpredictable pauses at larger heap sizes. And as alluded to above, the example off-heap direct memory storage area techniques described herein may be used on a single computer, in connection with an application running across multiple different computers nodes, at a server or as a part of a server array, and/or in various combinations and sub-combinations of these locations. Distributed caching therefore may be provided in a reliable manner, e.g., enabling data sharing among multiple cache managers and their caches in multiple JVMs. It thus becomes possible to linearly scale applications to grow with requirements, rely on data that remains consistent across the cluster, offload databases to reduce the associated overhead, increase application performance with distributed in-memory data, access even more powerful APIs to leverage these capabilities, etc. Thus, it will be appreciated that distributed caching techniques may be used in a clustered or scaled-out application environment, e.g., to provide high levels of performance, availability, and scalability. Certain example embodiments thus may be implemented as a software-only solution for otherwise hard-to-solve performance and scalability problems.

Figure 11:
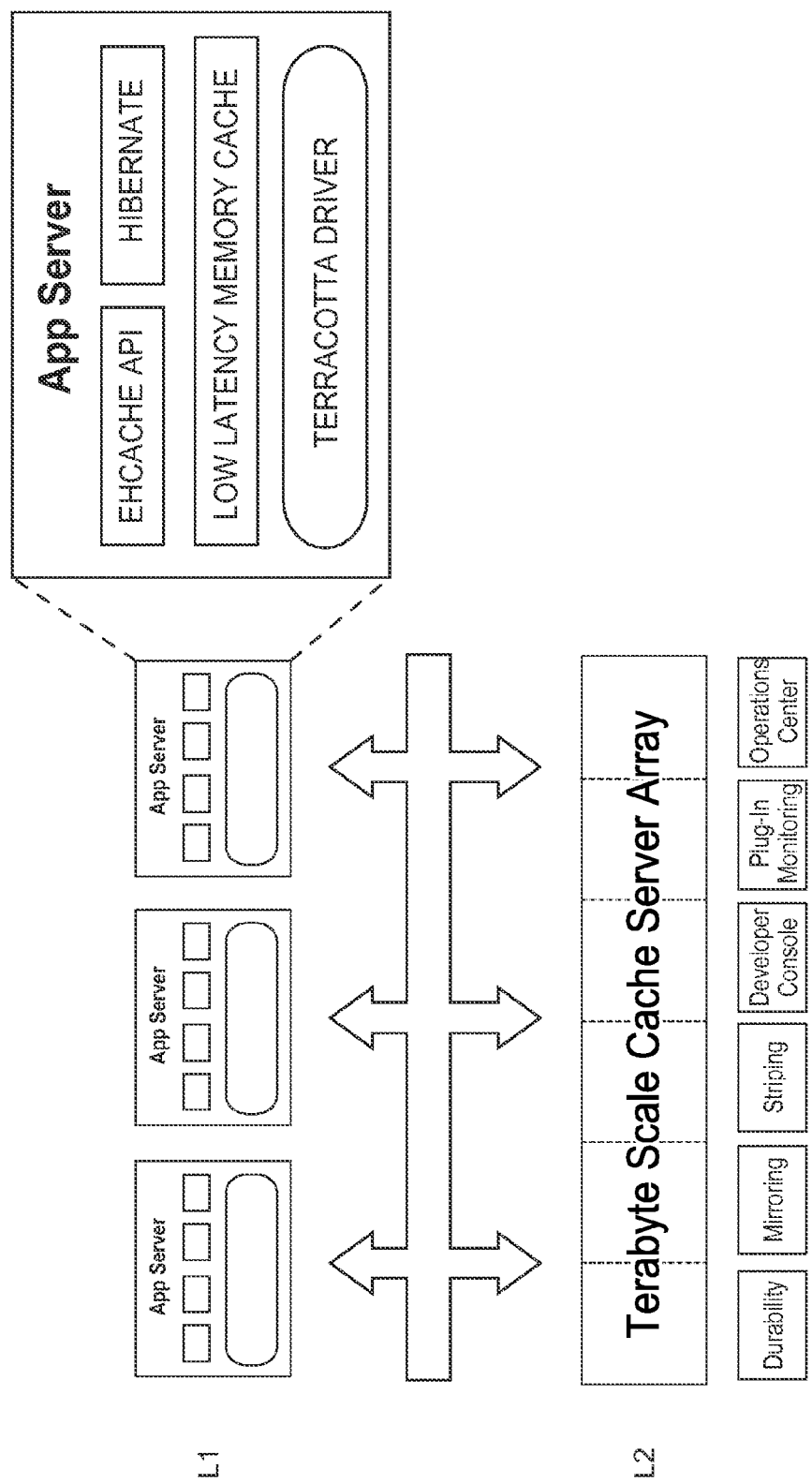
FIG. 11 is a logical view of a distributed cache system, in which a plurality of application servers connected to a server array over a network connection, in accordance with certain example embodiments.

FIG. 11 is a logical view of a distributed cache system, in which a plurality of application servers connected to a server array over a network connection, in accordance with certain example embodiments. As shown in FIG. 11, data may be split between a node level (the L1 cache) and a server array (the L2 Cache). As with the other replication mechanisms, the L1 can hold as much data as is comfortable for the node(s). A complete copy of all cache data may be provided in the L2 cache in certain example embodiments. The L1 may therefore acts as a hot-set of recently used data in some scenarios. Moreover, because this distributed caching approach is persistent and highly available, the cache may be largely unaffected by the termination of an particular node. For instance, when the node comes back up, it may simply reconnect to the Server Array L2 cache and fill in its local L1 cache as it uses data.

Figure 12:
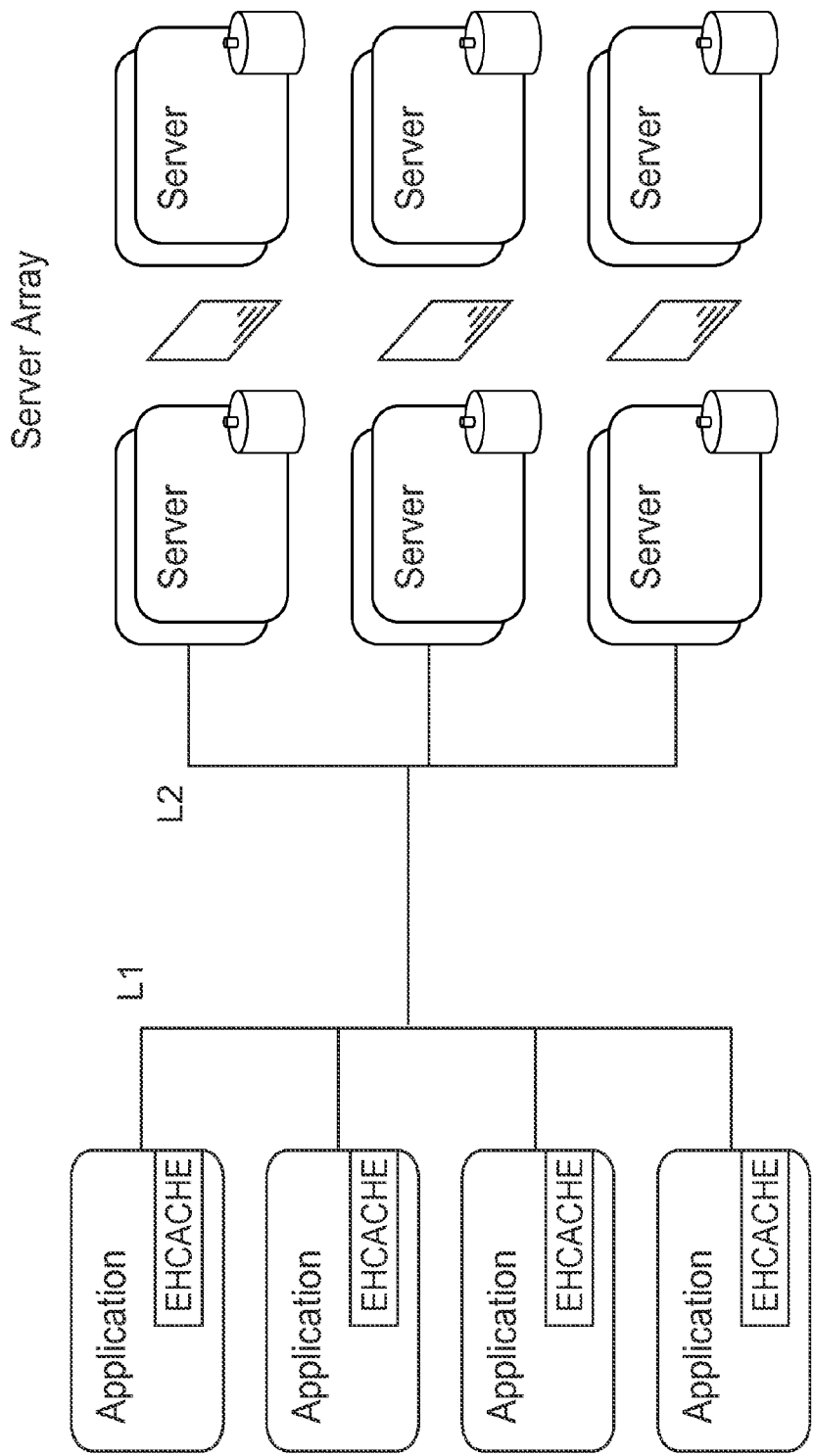
FIG. 12 shows a network topology point of view for a distributed cache system, in accordance with certain example embodiments.

FIG. 12 shows a network topology point of view for a distributed cache system, in accordance with certain example embodiments. As shown in FIG. 12, at L1, an Ehcache library may be present in each application, and an Ehcache instance, running in-process, sits in each JVM. At L2, each Ehcache instance (or node) maintains a connection with one or more servers. These servers may be arranged in pairs for high availability purposes, and a pair may be referred to as a mirror group. For high availability purposes, each server may run on a dedicated server. For scale out purposes, multiple pairs may be added. Consistent hashing is used by the nodes to store and retrieve cache data in the correct server pair. The terms stripe or partition may thus be used to refer to each mirror group.

Figure 13:
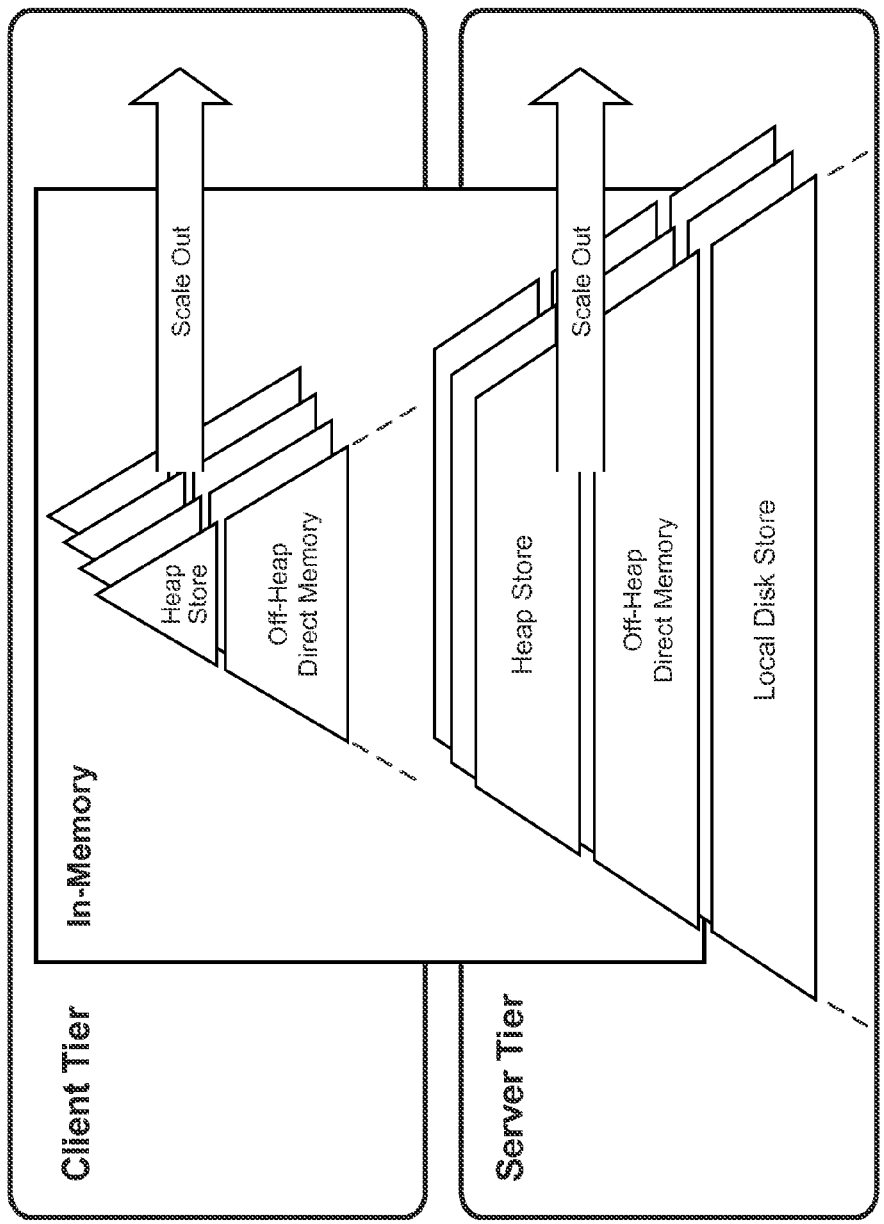
FIG. 13 presents a tiered memory hierarchy view of a distributed cache system, in accordance with certain example embodiments.

FIG. 13 presents a tiered memory hierarchy view of a distributed cache system, in accordance with certain example embodiments. Some or all in-process L1 instances may include heap memory and off-heap memory (e.g., using the direct byte buffer approaches described herein). Some or all L2s may include heap memory, off-heap memory, and disk storage (e.g., for persistence in the event both servers in a mirror group suffer a crash or power outage at the same time). It is noted that some L1 instances also may include physical disk storage for these and/or other purposes.

Figure 14:
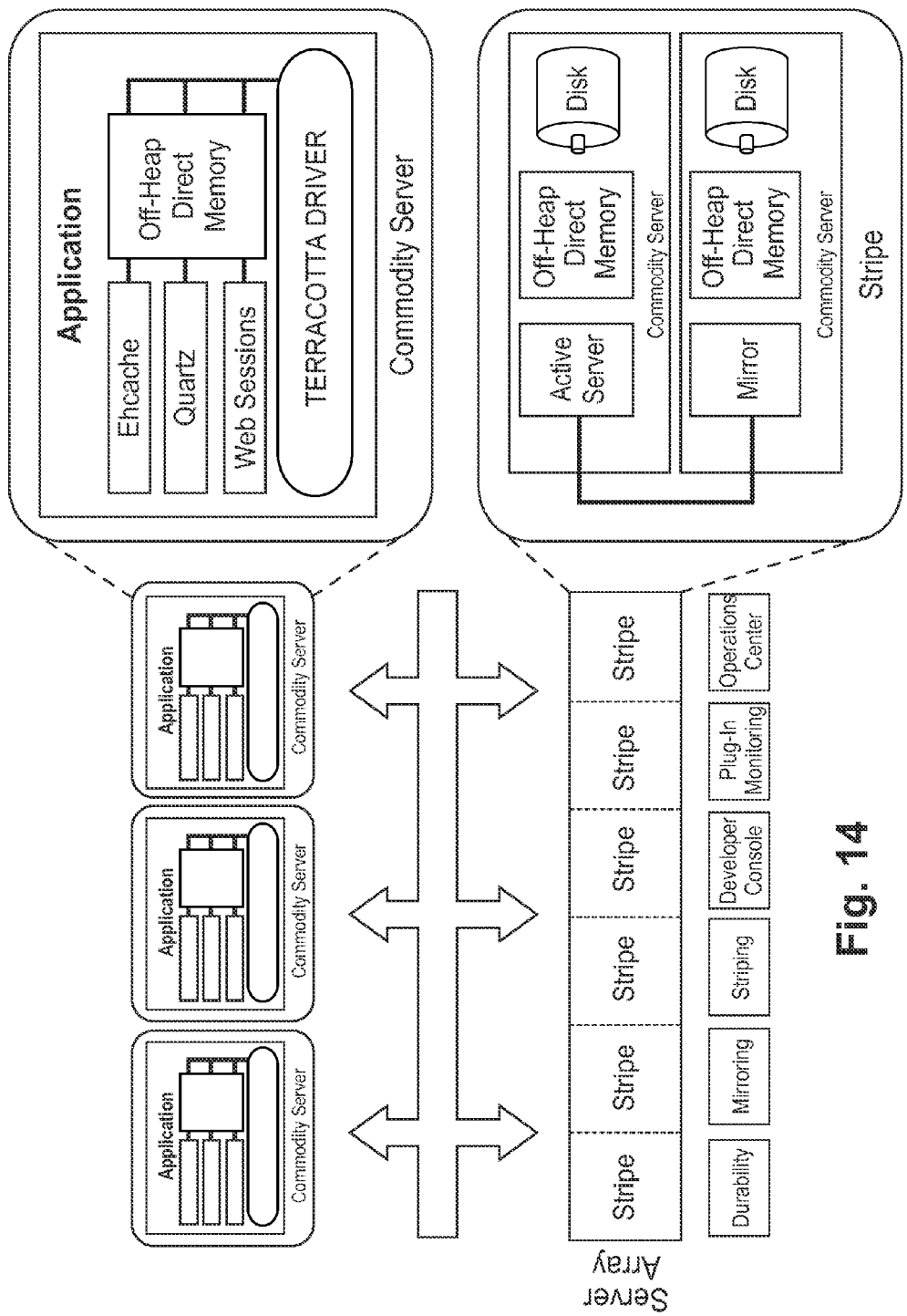
FIG. 14 is another block diagram showing an example architecture that includes off-heap direct memory management at both application tier and for a server array in accordance with certain example embodiments.

FIG. 14 is another block diagram showing an example architecture that includes off-heap direct memory management at both application tier and for a server array in accordance with certain example embodiments. As shown in FIG. 14, the application tier has multiple application servers to distribute application workload, and more can be added on demand to handle greater loads. Certain example embodiments may be compatible with a variety of application servers and containers such as, for example, Apache Tomcat, IBM WebSphere, JBoss, and Oracle WebLogic. Although multiple servers are shown in FIG. 14, it is noted that the techniques described herein may be used in connection with standalone Java server applications as well. Each application server has an in-memory cache behind an Ehcache interface that responds to cache lookups in microseconds.

Lookups for cache entries not present in the memory cache are automatically sent through the TCP communications layer to the server array. The server array responds to cache lookups in milliseconds. Writes to the cache in the application layer may be sent to the server array that coordinates acknowledging the write, persisting it to disk, and making the cache update available with configurable consistency guarantees as needed to the rest of the servers in the application tier.

The server array is an independently scalable set of cache servers that run on commodity hardware. This array delivers enterprise-grade data management to Ehcache in the application tier. Each cache server may have an in-memory cache and a disk-backed permanent store. Similar to RAID, the array may be configured into groups of servers to form mirrored stripes. The data in the distributed cache is partitioned across the existing stripes. More stripes can be added on-demand to increase the total addressable cache size and I/O throughput. For instance, for high availability, each stripe may be transactionally mirrored. Should a server node in a stripe be restarted or fail, one of the mirrors may automatically take its place, helping to provide improved uptime and data reliability.

The tiered combination of configurable in-memory caches backed by durable on-disk storage may help allow for high-performance access to very large caches without requiring hundreds of servers to fit all of the cache in memory. In the application layer, the in-process Ehcache cache in each application server may use a configurable amount of memory to provide low-latency access to as much cache data as fits in available RAM. The example off-heap direct memory techniques described herein may be used to accommodate hundreds of gigabytes (or even more) per JVM. Data that does not fit in memory may be automatically retrieved from the server array on an as-needed basis.

The server array similarly may have a configurable disk-backed memory cache. The memory cache and the number of stripes in the server array can be sized to fit as much data in memory as required or as desirable. This flexibility may allow for terabyte or larger scale caches to fit in manageable and cost-effective server arrays of two to a dozen commodity servers.

Applications may be able to retrieve any cache entry from the same Ehcache interface, regardless of whether that entry is in local memory or in the server array. If the cache entry is stored in memory on the application server, the cache read will return in microseconds in certain example instances. If the cache entry is not in local memory, it will be automatically retrieved from the server array, potentially in milliseconds.

To improve the performance of an enterprise application, the following and/or other aspects may be balanced according to their relative impact on meeting the requirements of the application, namely, throughput (e.g., commonly measured as the rate of transactions the application is capable of handling); latency (e.g., the time it takes for individual transactions to complete); and consistency (e.g., the level of predictability, coherency, and correctness of data on which the application operates). Using the techniques of certain example embodiments, throughput can be increased by adding more stripes to the server array; and/or latency can be reduced and available CPU power for application operations can be increased by adding more application servers in the application tier.

The separation of application logic in the application tier from cache management logic in the server array may allow each to be optimized according to its specific task. For instance, the in-process cache present in the application tier may be optimized for high concurrency and low thread contention that increases the performance of each application node. In certain scenarios, because the hardware operating in the application tier is not overloaded with cache server tasks, its resources can be devoted to application business logic. The application JVM heap can be configured to be relatively small and, therefore, immune to garbage collection operations that cause long service interruptions in peer-to-peer caches.

The dedicated cache server functions of the server array may provide a central authority that enables a number of runtime optimizations not available to other cache technologies. For instance, transactions can be batched, folded, and reordered at runtime to increase throughput. Latency may be reduced because no cross-node acknowledgements are required. The server array can be scaled elastically on demand with no downtime in certain example instances. Each stripe in the server array may be a share-nothing partition of the cache data that is spread across the stripes using a round-robin partitioning algorithm. As a result, new stripes can be added with no additional overhead. In contrast to a static partitioning scheme, for example, the round robin partitioning used by the server array may allow for new stripes to be added without rehashing all of the stripes. As a result, new stripes can be brought online more quickly.

In view of the foregoing, then, it will be appreciated that some or all of the following and/or other features may become possible:

In certain example embodiments, a computer system comprising at least one processor is provided, A non-transitory computer readable storage medium tangibly stores data. A software application is executable by the at least one processor and programmed to make use of the data. Off-heap memory is dynamically allocated and directly managed by a memory manager, such that the off-heap memory is perceivable by the software application as being a part of local application tier memory and manageable, after initial allocation, independent of any memory managers of the computer system and any memory managers of an operating system running on the computer system. The off-heap memory is scalable up to a size of the computer system's memory, upon direction from the memory manager, to accommodate terabytes-worth of data so that that data stored in the off-heap memory is transparently providable to the software application from the off-heap memory within microseconds and without having to repeatedly access that data from the non-transitory computer readable storage medium.

According to certain example embodiments, the software application and/or the memory manager is/are Java-based.

According to certain example embodiments, the data stored in the off-heap memory is data from the non-transitory computer readable storage medium and/or data from a network data source.

According to certain example embodiments, the data in the off-heap storage becomes accessible to legacy systems and/or applications through the memory manager.

According to certain example embodiments, the off-heap memory provides for the software application a terabyte-sized window to terabyte-sized data.

According to certain example embodiments, data in the off-heap memory is mirrored to a physical storage location (e.g., for high availability purposes).

In certain example embodiments, there is provided a method of managing memory of a computer system including at least one processor, a non-transitory computer readable storage medium tangibly storing data, and a software application executable by the at least one processor and programmed to make use of the data. An off-heap direct memory data storage area is dynamically allocated and directly managed, using a memory manager, such that the off-heap direct memory data storage area is perceivable by the software application as being a part of local application tier memory and manageable, after initial allocation, independent of any memory managers of the computer system and any memory managers of an operating system running on the computer system. The off-heap direct memory data storage area is scalable up to a size of the computer system's memory, upon direction from the memory manager, to accommodate terabytes-worth of data so that that data stored in the off-heap direct memory data storage area is transparently providable to the software application from the off-heap memory within microseconds and without having to repeatedly access that data from the non-transitory computer readable storage medium.

The method may operate in connection with a Java-based environment, and may further comprise: (a) attempting to allocate Java byte buffers in chunks of a preconfigured maximum size in response to a request for off-heap direct memory data storage at a predetermined maximum size; (b) repeating said attempts to allocate byte buffers until the off-heap direct memory data storage area is created at the predetermined size, or until an attempt fails, whichever comes first; (c) when an attempt to allocate byte buffers fails, reducing the preconfigured maximum size and repeating (a)-(b); (d) receiving a request for a region of the off-heap direct memory data storage area, the region having an associated size; (e) finding, via a page source, an unused slice of the off-heap direct memory data storage area; (f) returning a page indicative of the unused slice, the page being a wrapped byte buffer that includes a reference to the slice where data is to be stored and a reference to an allocator object that created the slice; (g) continuing to return pages until the off-heap direct memory data storage area is exhausted; (h) managing the returned pages from the off-heap direct memory data storage area as a single coherent logical address space storing data keys and values, with a single page in the off-heap direct memory data storage area storing a hash table with metadata information linking data keys to values; and optionally (i) expanding and contracting the hash table in response to further entries being added thereto and removed therefrom, respectively, by rehashing into a new page.

According to certain example embodiments, the preconfigured maximum size is cut in half upon a fail for an attempted allocation.

According to certain example embodiments, the method may further include causing a fault when the preconfigured maximum size is reduced below a threshold value.

According to certain example embodiments, references to slices where data is stored or is to be stored are offsets into one or more larger buffers.

According to certain example embodiments, the managing in (h) is practiced using malloc and free algorithms.

According to certain example embodiments, data keys and values are stored as byte arrays.

According to certain example embodiments, the hash table is stored as an IntBuffer.

According to certain example embodiments, pages are returned such that each said page has a size that is a power of 2. According to certain example embodiments, data may be stored to the off-heap direct memory data storage area at an address that has the same power of 2 as the size of each said page.

According to certain example embodiments, a single tree is associated for each chunk, with each said tree being augmented to act as a region set that stores the set of free regions within the associated chunk. According to certain example embodiments, each said tree is an AA tree. According to certain example embodiments, the set of free areas found in each sub-tree of a given AA tree is stored in a bit mask.

According to certain example embodiments, page stealing is enabled and allows a page to be shared amongst different consumers of pages. According to certain example embodiments, the single page including the hash table is not stealable.

According to certain example embodiments, each page request includes a thief parameter indicating whether an in-use page should be stolen to meet an allocation request (if necessary) and thereby create a new page; a victim parameter associated with the new page created to honor this page request indicating whether the new page can subsequently be stolen to meet another allocation request; and an owner parameter indicating who the owner of the new page is. According to certain example embodiments, the thief and victim parameters are numeric values that indicate relative priority for page steals.

According to certain example embodiments, when a page source indicates that it needs space and a page of a suitable size cannot be returned, the method may further comprise: locating both free areas and pages labeled as victims in attempting to find a target area of a suitable size to meet the page source's request; contacting, on the part of the page source, the owner(s) of victim page(s) within the target area; causing the victim page(s) owners to any remove pointer(s) thereto; and returning, to the page source, the victim page(s) in the target area.

According to certain example embodiments, first and second tree structures may be maintained for each said chunk, with the first tree structure indicating free regions within that chunk and the second tree structure indicating free and victim areas within that chunk.

According to certain example embodiments, the memory manager is configured to avoid Java garbage collection following (a).

It is noted that these and/or other example techniques may be applied regardless of where the off-heap direct memory storage area is located. For instance, it is noted that these and/or other example techniques may be applied for off-heap direct memory storage areas located on application servers, nodes in a server array, etc.

In certain example embodiments, a computer system is provided. A plurality of computer nodes are provided, and an application is executable across the plurality of computer nodes in a Java Virtual Machine (JVM) environment. Each computer node comprises at least one processor; memory management software; and an off-heap direct memory data storage area dynamically allocated and directly managed by the memory management software of the associated computer node, with the off-heap direct memory data storage area being scalable upon direction from the memory management software of the associated computer node to accommodate terabytes-worth of data so that that data stored in the off-heap direct memory data storage area is providable therefrom without having to repeatedly access that data from a non-transitory computer readable storage medium or a network storage location.

According to certain example embodiments, each computer node is configured to search its own off-heap direct memory data storage area for required data before checking off-heap direct memory data storage area(s) of any other computer node(s) and before checking the network storage location.

In certain example embodiments, a system is provided. An application is executable on at least one computer. A server array of independently scalable coordinated memory managers and associated data storage nodes also is provided. Each said data storage node comprises a non-transitory computer readable storage medium tangibly storing data usable by the application. Each said memory manager comprises: at least one processor, and off-heap memory dynamically allocated and directly managed by the memory manager. The off-heap memory is scalable upon direction from the memory manager to accommodate terabytes-worth of data so that that data stored in the off-heap memory is providable from the off-heap memory without having to repeatedly access that data from the non-transitory computer readable storage medium of the node. The at least one computer includes program logic configured to automatically initiate a request for data from the server array when required data is not present in cache on the at least one computer, the request being transparent to the application.

According to certain example embodiments, the at least one computer may include a plurality of computers and the application may be executable across the plural computers.

According to certain example embodiments, each said computer may have its own memory manager for creating and managing an off-heap direct memory storage area thereon. For instance, according to certain example embodiments, each computer may include at least one processor; memory; computer-specific memory management software; and computer-specific off-heap direct memory data storage area dynamically allocated and directly managed by the computer-specific memory management software of the associated computer, with the computer-specific off-heap direct memory data storage area being scalable upon direction from the computer-specific memory management software of the associated computer to accommodate an amount of data up to the size of the memory of the associated computer.

According to certain example embodiments, each computer is configured to transparently check its own computer-specific off-heap direct memory data storage area for data prior to requesting that data from another computer and prior to requesting that data from the server array.

According to certain example embodiments, the server array is configured to fulfill requests within milliseconds based on microsecond data lookups to one of said memory managers.

According to certain example embodiments, each said memory manager in the server array further comprises a non-transitory computer readable storage medium to mirror data for high availability purposes.

According to certain example embodiments, the server array is transparently extensible such that additional memory managers and/or nodes are addable to the server array without having to reconfigure the application.

It is noted that these features, aspects, advantages, and embodiments may be combined in any suitable combination or sub-combination to yield yet further example embodiments. It also is noted that certain example embodiments relate to methods of operating the various systems, memory managers/memory management software components, etc.

Test Data

The tiered combination of configurable in-memory caches backed by durable on-disk storage allows high-performance access to very large caches without requiring hundreds of servers to fit all of the cache in memory.

To test the benefits of certain example embodiments, an experiment was designed and performed. The experiment required caching up to 350 GB of data in memory within a Java application. The experiment began with 100 GB of data cached into a 150 GB Java heap. Without tuning, the result was unusable, as back-to-back full garbage collection cycles consumed all of the processing time. After much tuning, and increasing the heap size to 200 GB to reduce the total heap occupancy, the application ran but suffered from terrible performance, as it was often interrupted by long garbage collection pauses. Keeping large caches in heap was not a scalable solution.

The test scenario involved combination of write-through and read-only operations. More particularly, the test scenario involved a cache where access was split evenly between reads and writes.

The test environment included a server with 24 cores and 378 GB of RAM, running Java SE 1.6.0_21 on Red Hat Enterprise Linux. All software, including the OS and the Java virtual machine, was 64-bit, allowing for a large memory address space. The test application was run in two test cases, namely, with a large Java heap (250 GB) for on-heap cache, and with a small Java heap (2 GB) and a 350 GB off-heap cache designed and managed according to certain example embodiments.

In both cases, a cache scenario where a "hot set" of 10% of the data was accessed through the cache 90% of the time was modeled. Application performance without the techniques of certain example embodiments degraded quickly and consistently as the cache size increased beyond 4 GB. However, the test case that included the techniques of certain example embodiments maintained very good performance and latency, consistently, as the cache reached 350 GB in size.

Figure 7:
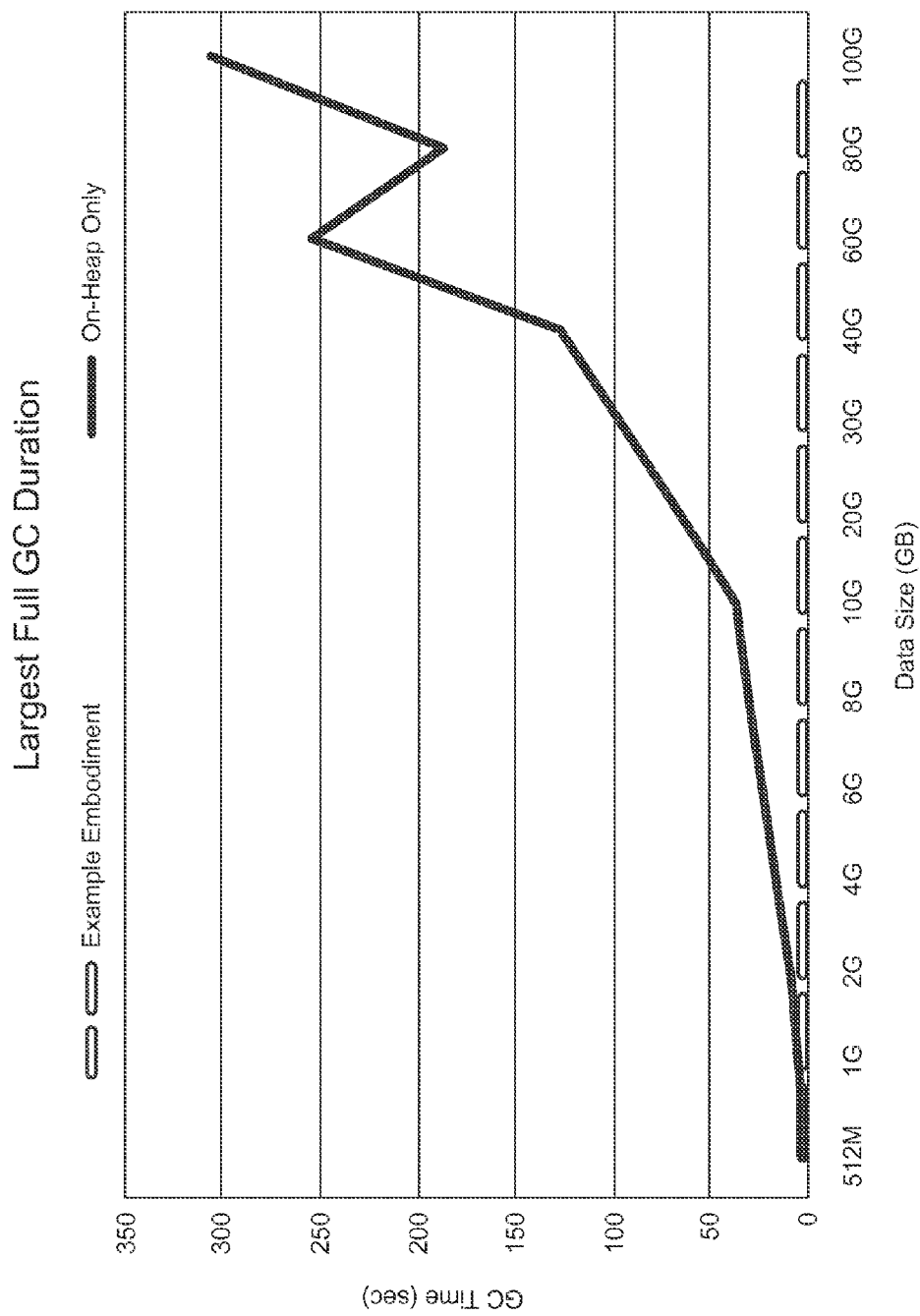
FIG. 7 is a chart that compares the largest full garbage collection duration activities for test cases where the off-heap memory management approaches of certain example embodiments were and were not implemented.

In both test cases, performance parameters such as total time spent garbage collecting as the cache size grew, as well as application throughput (in transactions per second) and maximum latency (presumably caused by garbage collection activity), were measured. FIG. 7 is a chart that compares the largest full garbage collection duration activities for test cases where the off-heap memory management approaches of certain example embodiments were and were not implemented. With the on-heap data cache, garbage collection times increased dramatically with the growth in heap occupancy until the application became non-responsive. With the techniques of certain example embodiments, however, since the data cache is kept in-memory but off of the Java heap, GC times remained constant and small even as cache size increased, e.g., because the off-heap cache was not subject to garbage collection.

Figure 8:
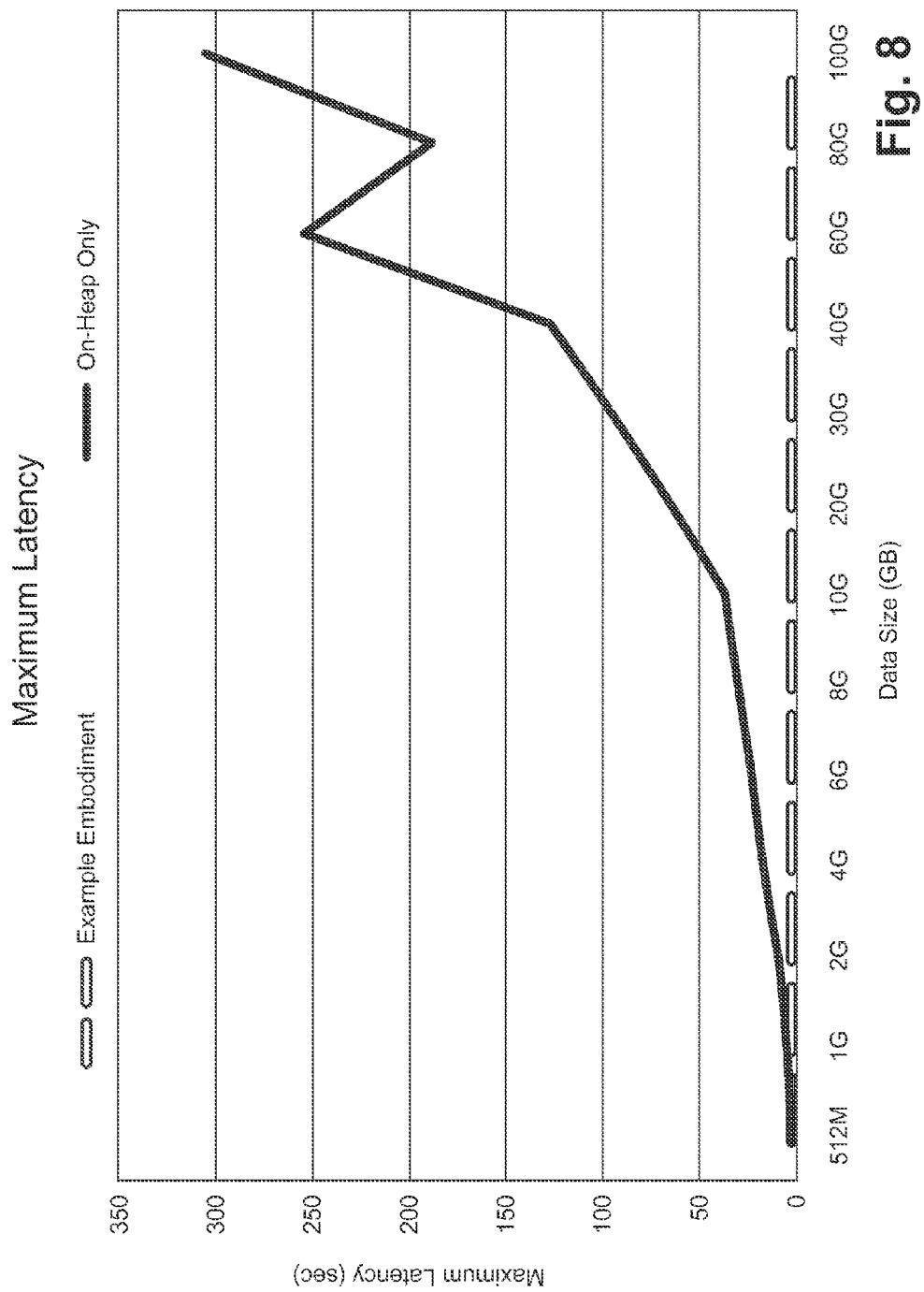
FIG. 8 is a chart that compares the maximum latency for test cases where the off-heap memory management approaches of certain example embodiments were and were not implemented.

FIG. 8 is a chart that compares the maximum latency for test cases where the off-heap memory management approaches of certain example embodiments were and were not implemented. As garbage collection durations increase in the on-heap cache test case, so does maximum latency. However, because the off-heap cache size does not affect the Java heap in certain example embodiments, garbage collection times remain consistent, and mostly non-existent, even as the cache size grows.

Figure 9:
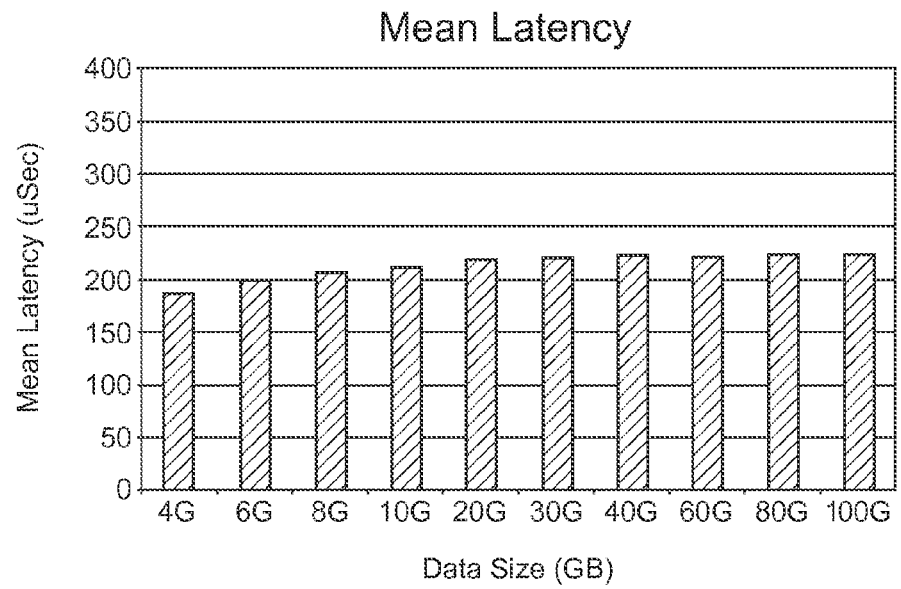
FIGS. 9-10 are charts that show mean latency and throughput, respectively, for increasing data sizes, when certain example embodiments are implemented.
Figure 10:
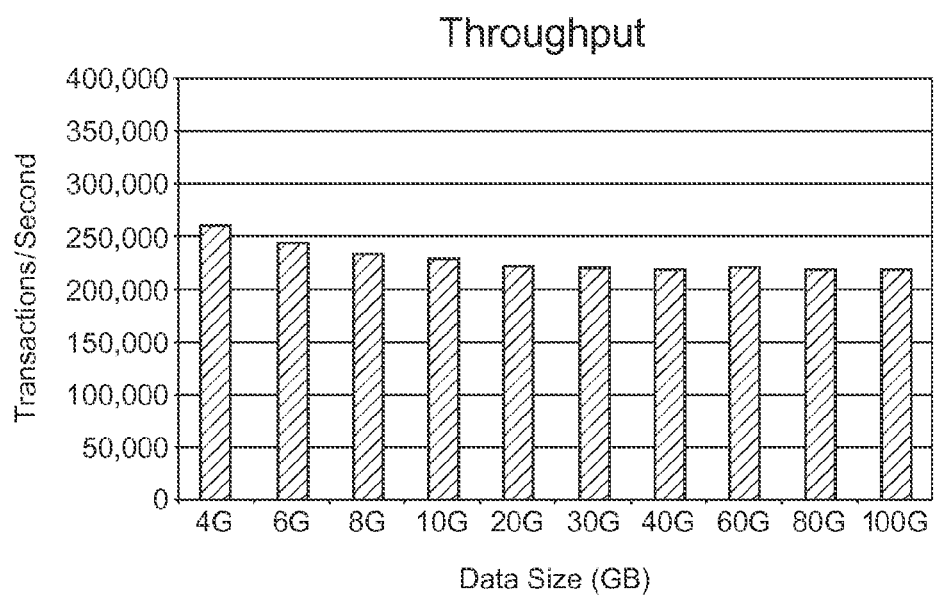

FIGS. 9-10 are charts that show mean latency and throughput, respectively, for increasing data sizes, when certain example embodiments are implemented. As can be seen from FIGS. 9-10, certain example embodiments provide consistent performance as the cache grows from 4 GB in size to 150 GB in size, and beyond. They also show that certain example embodiments help maximize memory usage in servers, predictably meet SLAs in terms of maximum latency and throughput even with very large data cache sizes (e.g., of 350 GB or more), and simplify deployment, as the cache does not necessarily need to be divided and distributed.

Running the on-heap configuration for a 20 GB cache yielded an average throughput of 261,618 TPS, with a total run time of 229,623 milliseconds (ms). This included a warm-up phase and several test runs to ensure peak performance. By contrast, running the same test configuration with certain example embodiments yielded an average throughput of 819, 998 TPS, with a run time of only 73,127 ms. Thus, there was a three-fold increase in throughput and performance over the on-heap test. The following table summarizes garbage collection related results that impact the overall performance.

| Metric | On-Heap Memory Only | Example Embodiment |
|---|---|---|
| Accumulated pauses/ Full garbage collection | 247.86 sec. | 1.03 sec. |
| Minimum pause | 27.02876 sec. | 0.17707 sec. |
| Maximum pause | 66.19026 sec. | 0.31218 sec. |
| Average Pause/ Full garbage collection | 49.57248 sec. ($\sigma$ = 14.32535) | 0.25739 sec. ($\sigma$ = 0.0571) |

The table above shows the total time spent garbage collecting during the test, along with the longest and shortest garbage collection pause durations, and the average duration. With the on-heap only approach, with a 20 GB Java heap to hold the 20 GB cache, it can be seen that over 247 seconds were spent garbage collecting, with a maximum pause time of about 66 seconds, and an average of almost 50 seconds per pause. This is contrastable with the approach of certain example embodiments that involved a test run with a much smaller heap (since the 20 GB cache was kept in the off-heap memory cache). In this latter case, the average pause was one-quarter of one second, the total garbage collection time was only about 1 second.

The following table presents data regarding throughput, which prompts a number of like conclusions.

| Metric | On-Heap Memory Only | Example Embodiment |
|---|---|---|
| Footprint | 20.608 MB | 198.438 MB |
| Freed Memory | 10,908.54 MB | 366.736 MB |
| Freed Memory/Minute | 2,259.784 MB/min. | 146.075 MB/min. |
| Total Time | 4 min., 49 sec. | 2 min., 30 sec. |
| Accumulated pauses | 247.86 sec. | 1.03 sec. |
| Throughput | 14.42% | 99.32% |
| Full garbage collection performance | 44.01 MB/sec. | 356.203 MB/sec. |

The table above demonstrates that with certain example embodiments, Java spends most of its time running application code as opposed to performing garbage collection activities. With the on-heap cache, the results are reversed: Most of the time is spent performing garbage collection activities, with application code running less than 15% of the time. In these tests, in terms of throughout and latency, the approach of certain example embodiments clearly provides superior performance when compared with a cache that resides on the Java heap.

In addition to these specific tests, in other implementations, performance gains and latency improvements have been observed in the 15× to 100× range. For example, a 100× improvement was measured using disk-based databases over a LAN; a 15× improvement using RAM-based solid-state drives (SSD) was observed; and even greater performance improvements have been noted with Flash-based SSDs.

Notwithstanding the example configurations used in the tests discussed above, it will be appreciated that certain example embodiments may be made to work in implementations where garbage collection tuning is or is not an ongoing time-consuming task; for 32-bit or 64-bit versions of the Java virtual machine; where cache sizes are as small or large (e.g., from 2 GB to 250 GB and beyond); with applications that use local or distributed caches; etc.

Certain example embodiments may involve an open source approach.

Across the enterprise, there are typically requirements to support data access along a spectrum of consistency guarantees. This spectrum may range from purely asynchronous operations suitable for read-only access, to fully transactional access to business-critical data. Certain example embodiments may provide for a true consistency continuum ranging from eventual (with monotonic reads and writes) to fully locked, e.g., thereby providing a more flexible and configurable solution that potentially meets the consistency requirements of the user in a manner that improves performance. This may be a configurable parameter in certain example embodiments.

Certain example embodiments may involve XA transactions, e.g., so as to accommodate existing XA users, or others with strict transactional requirements from the cache.

Example

It will be appreciated that "accommodating terabytes-worth of data" means accommodating (e.g., scaling to, managing, generally making available, etc.) at least 1 TB of data. Thus, when it is said, for example, that the off-heap memory is scalable up to a size of the computer system's memory, upon direction from the memory manager, to accommodate terabytes-worth of data, it will be understood that the off-heap memory is scalable up to 1 TB, 10 TB, 100 TB, and/or beyond, and may be limited by, e.g., the size of the computer system's memory. Similarly, the phrase "up to the size of the computer system's memory" and similar such phrases should not be strictly interpreted, as it will be appreciated that scaling all the way up to the size of the computer system's memory may be practically prohibited in some cases because of other items occupying at least some space therein, e.g., the OS kernel, etc. Instead, these phrases might be better understood, for example and in certain scenarios, as "to the fullest extent possible" or as "all of the computer system's available memory." For instance, a Linux kernel may occupy 1 GB in a system having 1 TB of memory, thereby allowing the example memory managers disclosed herein access to 999 GB worth of computer memory, with the memory managers still being said to have access to an amount of memory up to the size of the computer system's memory.

The term "within milliseconds" may in some cases mean within no more than 10 seconds, more preferably within no more than 1 second. Similarly, the term "within microseconds" may in some cases mean within no more than 10 milliseconds, more preferably within no more than 1 millisecond. Further power of ten reductions are yet more desirable and may be achieved by certain example embodiments.

It will be appreciated that the word "Java" may imply either or both of a language and a technology, depending on the particular context in which it is used. In this latter sense, "Java" is a worldwide standard encompassing far more than the original language definition. Thus, it will be appreciated that a "Java-based environment" may refer to an environment that uses this broad technology area, whether that be in the context of an application written in Java itself, an application using a JVM (which may support many languages, the Java language being one of them), and/or the like.

Although certain example embodiments have been described as pertaining to Java- and/or Java-based environments, it will be appreciated that the example techniques disclosed herein may apply to any system that includes a garbage-collected environment that can and/or should be avoided, e.g., to enhance performance in the above-described and/or other ways.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system, comprising:
    at least one processor;
    a non-transitory computer readable storage medium tangibly storing data;
    a software application executable by the at least one processor and programmed to make use of the data; and
    off-heap memory, dynamically allocated and directly managed by a memory manager, such that the off-heap memory is perceivable by the software application as being a part of local application tier memory and manageable, after initial allocation, independent of other memory managers of the computer system and of an operating system running on the computer system,
    wherein the off-heap memory is scalable up to a size of the computer system's memory, upon direction from the memory manager, and
    wherein the memory manager is configured to at least:
        (a) attempt to allocate first data containers in chunks of a preconfigured maximum size in response to a request for off-heap memory at a predetermined maximum size;
        (b) repeat said attempts to allocate first data containers until the off-heap memory is created at the predetermined size, or until an attempt fails, whichever comes first;
        (c) reduce the preconfigured maximum size and repeat (a)-(b) in response to an attempt to allocate first data containers failing;
        (d) receive a request for a region of the off-heap memory, the region having an associated size;
        (e) find, via a second data container source, an unused slice of the off-heap memory;
        (f) return a second data container indicative of the unused slice, the second data container being a wrapped first data container that includes a reference to the slice where data is to be stored and a reference to an allocator object that created the slice;
        (g) continue to return second data containers until the off-heap memory is exhausted; and
        (h) manage the returned second data containers from the off-heap memory as a logical address space storing data keys and values.

2. The system of claim 1, wherein the software application and the memory manager are Java-based.

3. The system of claim 1, wherein the memory manager is further configured to manage the returned second data containers from the off-heap memory as a single coherent logical address space storing data keys and values, with a single second data container in the off-heap memory storing a hash table with metadata information linking data keys to values.

4. The system of claim 1, wherein the data in the off-heap storage becomes accessible to legacy systems and/or applications through the memory manager.

5. The system of claim 1, wherein the off-heap memory provides for the software application a terabyte-sized window to terabyte-sized data.

6. The system of claim 1, wherein the first data containers are implemented as byte buffers, the second data containers are implemented as pages, and the second data container sources are page sources.

7. The system of claim 1, wherein the off-heap memory is transparently providable to the software application without having to repeatedly access that data from the non-transitory computer readable storage medium.

8. The system of claim 1, wherein the preconfigured maximum size is cut in half upon a fail for an attempted allocation.

9. The system of claim 1, wherein the memory manager is further configured to cause a fault when the preconfigured maximum size is reduced below a threshold value.

10. The system of claim 1, wherein references to slices where data is stored or is to be stored are offsets into one or more data containers larger than the first data containers.

11. The system of claim 1, wherein second data containers are returned such that each second data container has a size that is a power of 2.

12. The system of claim 11, wherein the memory manager is further configured to store data to the off-heap memory at an address that has the same power of 2 as the size of each second data container.

13. The system of claim 1, wherein the memory manager is further configured to enable second data container stealing to allow a second data container to be shared amongst different consumers of second data containers.

14. The system of claim 13, wherein a second data container request includes a thief parameter indicating whether an in-use second data container may be stolen to meet an allocation request (if necessary) and thereby create a new second data container; a victim parameter associated with the new second data container created to honor this second data container request indicating whether the new second data container can subsequently be stolen to meet another allocation request; and an owner parameter indicating who the owner of the new second data container is.

15. The system of claim 14, wherein the thief and victim parameters are numeric values that indicate relative priority for second data container steals.

16. The system of claim 1, further comprising when a second data container source indicates that it needs space and a second data container of a suitable size cannot be returned:
    locating both free areas and second data containers labeled as victims in attempting to find a target area of a suitable size to meet the second data container source's request;
    contacting, on the part of the second data container source, the owner(s) of victim second data container(s) within the target area;
    causing the victim second data container(s) owners to any remove pointer(s) thereto; and
    returning, to the second data container source, the victim second data container(s) in the target area.

17. The system of claim 16, further comprising maintaining first and second tree structures for each said chunk, the first tree structure indicating free regions within that chunk and the second tree structure indicating free and victim areas within that chunk.

18. A computer system, comprising:
a plurality of computer nodes, an application being executable across the plurality of computer nodes in a runtime environment, wherein:
each computer node comprises:
at least one processor,
memory management software, and
an off-heap direct memory data storage area dynamically allocated and directly managed by the memory management software of the associated computer node, the off-heap direct memory data storage area being scalable upon direction from the memory management software of the associated computer node, data stored in the off-heap direct memory data storage area being providable therefrom without having to repeatedly access that data from a non-transitory computer readable storage medium or a network storage location; and
the off-heap direct memory data storage area of each node being excluded from garbage collection operations managed by the runtime environment.

19. The computer system of claim 18, wherein each computer node is configured to search its own off-heap direct memory data storage area for required data before checking off-heap direct memory data storage area(s) of any other computer node(s) and before checking the network storage location.

20. The computer system of claim 18, wherein the runtime environment is a Java Virtual Machine (JVM) runtime environment and the memory management software of each said computer node is configured to:
(a) attempt to allocate Java byte buffers in chunks of a preconfigured maximum size in response to a request for off-heap direct memory data storage at a predetermined maximum size;
(b) repeat said attempts to allocate byte buffers until the off-heap direct memory data storage area is created at the predetermined size, or until an attempt fails, whichever comes first;
(c) reduce the preconfigured maximum size and repeat (a)-(b) when an attempt to allocate byte buffers fails;
(d) receive a request for a region of the off-heap direct memory data storage area, the region having an associated size;
(e) find, via a page source, an unused slice of the off-heap direct memory data storage area;
(f) return a page indicative of the unused slice, the page being a wrapped byte buffer that includes a reference to the slice where data is to be stored and a reference to an allocator object that created the slice;
(g) continue to return pages until the off-heap direct memory data storage area is exhausted; and
(h) manage the returned pages from the off-heap direct memory data storage area as a single coherent logical address space storing data keys and values, with a single page in the off-heap direct memory data storage area storing a hash table with metadata information linking data keys to values.

21. The computer system of claim 20, wherein the memory management software of each said computer node is further configured to (i) expand and contract the hash table in response to further entries being added thereto and removed therefrom, respectively, by rehashing into a new page.

22. A system, comprising:
an application executable on at least one computer; and
a server array of independently scalable coordinated memory managers and associated data storage nodes; wherein:
each said data storage node comprises a non-transitory computer readable storage medium tangibly storing data usable by the application,
each said memory manager comprises:
at least one processor, and
off-heap memory dynamically allocated and directly managed by the memory manager,
the off-heap memory being scalable upon direction from the memory manager, data stored in the off-heap memory being providable from the off-heap memory without having to repeatedly access that data from the non-transitory computer readable storage medium of the node, and
the at least one computer includes program logic configured to automatically initiate a request for data from the server array when required data is not present in cache on the at least one computer, the request being transparent to the application.

23. The system of claim 22, wherein the at least one computer includes a plurality of computers and the application is executable across the plural computers.

24. The system of claim 23, wherein each computer comprises:
at least one processor;
memory;
memory management software; and
off-heap direct memory data storage area dynamically allocated and directly managed by the memory management software of the associated computer, the off-heap direct memory data storage area being scalable upon direction from the memory management software of the associated computer to accommodate an amount of data up to the size of the memory of the associated computer.

25. The system of claim 24, wherein each computer is configured to transparently check its own off-heap direct memory data storage area for data prior to requesting that data from another computer and prior to requesting that data from the server array.

26. The system of claim 22, wherein each said memory manager in the server array further comprises a non-transitory computer readable storage medium to mirror data.

27. The system of claim 22, wherein the server array is transparently extensible such that additional memory managers and/or nodes are addable to the server array without having to reconfigure the application.

* * * * *